(12) United States Patent
Tamayo et al.

(10) Patent No.: US 7,117,208 B2
(45) Date of Patent: *Oct. 3, 2006

(54) ENTERPRISE WEB MINING SYSTEM AND METHOD

(75) Inventors: Pablo Tamayo, Cambridge, MA (US); Jacek Myczkowski, Harvard, MA (US); Marcos Campos, Cambridge, MA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/013,339

(22) Filed: Dec. 17, 2004

(65) Prior Publication Data

US 2005/0102292 A1   May 12, 2005

Related U.S. Application Data

(63) Continuation of application No. 09/963,401, filed on Sep. 27, 2001, now Pat. No. 6,836,773.

(60) Provisional application No. 60/235,926, filed on Sep. 28, 2000.

(51) Int. Cl.
*G06F 17/30* (2006.01)

(52) U.S. Cl. ................. 707/6; 707/10; 707/7; 709/200; 709/201

(58) Field of Classification Search .................... 707/6, 707/10, 7; 703/23; 715/500; 709/200, 201
See application file for complete search history.

(56) References Cited

U.S. PATENT DOCUMENTS

| | | | |
|---|---|---|---|
| 5,692,107 A | 11/1997 | Kerber et al. | |
| 5,970,464 A | 10/1999 | Apte et al. | 705/4 |
| 6,128,624 A | 10/2000 | Papierniak et al. | 707/104.1 |
| 6,151,584 A | 11/2000 | Papierniak et al. | 705/10 |
| 6,151,601 A | 11/2000 | Papierniak et al. | 707/10 |
| 6,230,153 B1 * | 5/2001 | Howard et al. | 707/2 |
| 6,278,966 B1 * | 8/2001 | Howard et al. | 703/23 |
| 6,324,533 B1 | 11/2001 | Agrawal et al. | 707/3 |
| 6,336,098 B1 * | 1/2002 | Fortenberry et al. | 705/14 |
| 6,449,739 B1 | 9/2002 | Landan | 714/47 |
| 6,470,383 B1 * | 10/2002 | Leshem et al. | 709/223 |
| 6,741,967 B1 * | 5/2004 | Wu et al. | 705/10 |
| 2004/0181457 A1 * | 9/2004 | Biebesheimer et al. | 705/26 |

FOREIGN PATENT DOCUMENTS

WO   00 20982 A   4/2000

OTHER PUBLICATIONS

Cui et al., Web Clustering, Filtering and Applications: On improving local Website search using web server traffic logs: a preliminary report; ACM, Nov. 2005.*

(Continued)

*Primary Examiner*—Frantz Coby
(74) *Attorney, Agent, or Firm*—Bingham McCutchen LLP

(57) ABSTRACT

An enterprise-wide web data mining system, computer program product, and method of operation thereof, that uses Internet based data sources, and which operates in an automated and cost effective manner. The enterprise web mining system comprises: a database coupled to a plurality of data sources, the database operable to store data collected from the data sources; a data mining engine coupled to the web server and the database, the data mining engine operable to generate a plurality of data mining models using the collected data; a server coupled to a network, the server operable to: receive a request for a prediction or recommendation over the network, generate a prediction or recommendation using the data mining models, and transmit the generated prediction or recommendation.

26 Claims, 18 Drawing Sheets

OTHER PUBLICATIONS

Mobasher B et al.: "*Automatic Personalization Based on Web Usage Mining*"; Communications of the Association for Computing Machinery, New York, vol. 43, No. 8, Aug. 2000; pp. 142-151.
Cooley R et al. "*Web Mining: Information and Pattern Discovery on the World Wide Web*"; Tools with Artificial Intelligence, 1997. Proceedings. Nov. 1997, Las Alamitos, CA.
Kleissner C: "*Data Mining for the Enterprise*"; System Sciences, 1998., Proceedings of the $31^{st}$ Hawaii Int'l Conf. on Kohala Coast, HI, Jan. 1998, Los Altamitos, CA.
Srivastava et al.; "*Web Usage Mining: Discovery and Applications of Usage Patterns from Web Data*"; Sigkdd Explorations, Assoc. for Computing Machinery, vol. 1, No. 2, Jan. 2000; pp. 12-23.

* cited by examiner

ENTERPRISE WEB MINING SYSTEM AND METHOD

CROSS-REFERENCE TO RELATED APPLICATIONS

This application is a continuation of application Ser. No. 09/963,401, now U.S. Pat. No. 6,836,773, filed Sep. 27, 2001, which claims the benefit of provisional Application No. 60/235,926, filed Sep. 28, 2000.

FIELD OF THE INVENTION

The present invention relates to an enterprise web mining system for generating online predictions and recommendations.

BACKGROUND OF THE INVENTION

Data mining is a technique by which hidden patterns may be found in a group of data. True data mining doesn't just change the presentation of data, but actually discovers previously unknown relationships among the data. Data mining is typically implemented as software in or in association with database systems. There are two main areas in which the effectiveness of data mining software may be improved. First, the specific techniques and processes by which the data mining software discovers relationships among data may be improved. Such improvements may include speed of operation, more accurate determination of relationships, and discovery of new types of relationships among the data. Second, given effective data mining techniques and processes, the results of data mining are improved by obtaining more data. Additional data may be obtained in several ways: new sources of data may be obtained, additional types of data may be obtained from existing sources of data, and additional data of existing types may be obtained from existing sources.

A typical enterprise has a large number of sources of data and a large number of different types of data. For example, an enterprise may have an inventory control system containing data regarding inventory levels of products, a catalog system containing data describing the products, an ordering system containing data relating to customer orders of the products, an accounting system containing data relating to costs of producing and shipping products, etc. In addition, some sources of data may be connected to proprietary data networks, while other sources of data may be connected to and accessible from public data networks, such as the Internet.

While data mining has been successfully applied to individual sources of data, enterprise-wide data mining has not been so successful. The traditional technique for performing enterprise-wide data mining is involves manual operation of a number of data integration, pre-processing, mining, and interpretation tools. This traditional process is expensive and time consuming to the point that it is often not feasible for many enterprises. The advent of Internet based data sources, including data relating to World Wide Web transactions and behavior only exacerbated this problem. A need arises for a technique by which enterprise-wide data mining, especially involving Internet based data sources, may be performed in an automated and cost effective manner.

SUMMARY OF THE INVENTION

The present invention is an enterprise-wide web data mining system, computer program product, and method of operation thereof, that uses Internet based data sources, and which operates in an automated and cost effective manner.

In accordance with the present invention, a method of enterprise web mining comprises the steps of: collecting data from a plurality of data sources; integrating the collected data; generating a plurality of data mining models using the collected data; and generating a prediction or recommendation in response to a received request for a recommendation or prediction.

In one aspect of the present invention, the collecting step comprises the steps of: acquiring data from the plurality of data sources; selecting data that is relevant to a desired output from among the acquired data; pre-processing the selected data; and building a plurality of database tables from the pre-processed selected data. The plurality of data sources comprises proprietary account or user-based data; complementary external data; web server data; and web transaction data. The web server data comprises: at least one of: web traffic data obtained by Transmission Control Protocol/Internet Protocol packet sniffing, web traffic data obtained from an application program interface of the web server, and a log file of the web server.

In one aspect of the present invention, the acquired data comprises a plurality of different types of data and integration step comprises the step of: forming an integrated database comprising collected data in a coherent format. The model generating step comprises the steps of: selecting an algorithm to be used to generate a model; generating at least one model using the selected algorithm and data included in the integrated database; and deploying the at least one model. The step of deploying the at least one model comprises the step of: generating program code implementing the model. The step of generating an online prediction or recommendation comprises the steps of: receiving a request for a prediction or recommendation; scoring a model using data included in the integrated database; generating a predication or recommendation based on the generated score; and transmitting the predication or recommendation.

In one embodiment, the step of pre-processing the selected data comprises the step of: performing, on the selected data, at least one of: data cleaning, visitor identification, session reconstruction, classification of web pages into navigation and content pages, path completion, and converting file names to page titles. In another embodiment, the step of pre-processing the selected data comprises the step of: collecting pre-defined items of data passed by a web server.

In accordance with the present invention, an enterprise web mining system comprises: a database coupled to a plurality of data sources, the database operable to store data collected from the data sources; a data mining engine coupled to the web server and the database, the data mining engine operable to generate a plurality of data mining models using the collected data; a server coupled to a network, the server operable to: receive a request for a prediction or recommendation over the network, generate a prediction or recommendation using the data mining models, and transmit the generated prediction or recommendation.

In one aspect of the present invention, the database comprises a plurality of database tables built from the collected data. The plurality of data sources comprises: proprietary account or user-based data; complementary external data; web server data; and web transaction data. The web server data comprises at least one of: web traffic data obtained by Transmission Control Protocol/Internet Protocol packet sniffing, web traffic data obtained from an application program interface of the web server, and a log file of the web server.

In one aspect of the present invention, the plurality of database tables forms an integrated database comprising collected data in a coherent format. The data mining engine is further operable to: select an algorithm to be used to generate a model; generate at least one model using the selected algorithm and data included in the integrated database; and deploy the at least one model. The deployed model comprises program code implementing the model. The server is operable to generate a prediction or recommendation by scoring a model using data included in the integrated database and generating a predication or recommendation based on the generated score.

In one aspect of the present invention, the system further comprises a data pre-processing engine pre-processing the selected data. The database comprises: a plurality of database tables built from the pre-processed selected data. The plurality of data sources comprises: proprietary account or user-based data; complementary external data; web server data; and web transaction data. The web server data comprises: at least one of: web traffic data obtained by Transmission Control Protocol/Internet Protocol packet sniffing, web traffic data obtained from an application program interface of the web server, and a log file of the web server. The plurality of database tables forms an integrated database comprising collected data in a coherent format. The data mining engine is further operable to: select an algorithm to be used to generate a model; generate at least one model using the selected algorithm and data included in the integrated database; and deploy the at least one model. The deployed model comprises program code implementing the model. The server is operable to generate a prediction or recommendation by scoring a model using data included in the integrated database and generating a predication or recommendation based on the generated score. The data pre-processing engine pre-processes the selected data by performing, on the selected data, at least one of: data cleaning, visitor identification, session reconstruction, classification of web pages into navigation and content pages, path completion, and converting file names to page titles. The data pre-processing engine pre-processes the selected data by collecting pre-defined items of data passed by a web server.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

The present invention is a technique by which enterprise-wide data mining, especially involving Internet based data sources, may be performed in an automated and cost effective manner. This technique, which includes enterprise-wide data mining involving Internet based data sources, may be termed enterprise web mining. Enterprise web mining involves a plurality of data intensive data sources and repositories with corporate, warehousing and web-transaction components. The methodology and framework of the present invention incorporates these data sources in a way suitable to build data mining inductive models, such as machine learning models, and provides the capability to solve different types of prediction and recommendation problems, along with the spectrum of web and traditional relational database management system functions. Besides prediction and recommendation functions, the present invention also provides the capability to find patterns and important relationships in clickstreams and other web generated data, as well as in traditional databases. The present invention provides improved prediction accuracy, the capability to capture and explain complex behavior, and the capability to make high value predictions and recommendations on a variety of business problems.

Definitions

Web mining—the use of methodologies and data mining algorithms to autonomously review the relationships contained in web data to find patterns that can be used to take actionable business decisions and support personalization and one-to-one business intelligence.

Recommendation—real-time recommendations take into account an individual's preferences and make predictions that allow specific personalized actions possible. Explicit recommendations, can be used for cross-sell or up-sell items. Implicit recommendations can be used for web site content, navigation, and other types of indirect advertising.

Enterprise Web Mining (EWM)—data mining combining a collection of data intensive data sources and repositories with corporate, warehousing and web-transaction components.

Implicit data—obtained from the web customer's actions; for example, click-throughs, purchases, and time listening to an audio track.

Explicit data—obtained from the web customer's answers to questions; for example, rating a book at Amazon.com.

System

Figure 1:
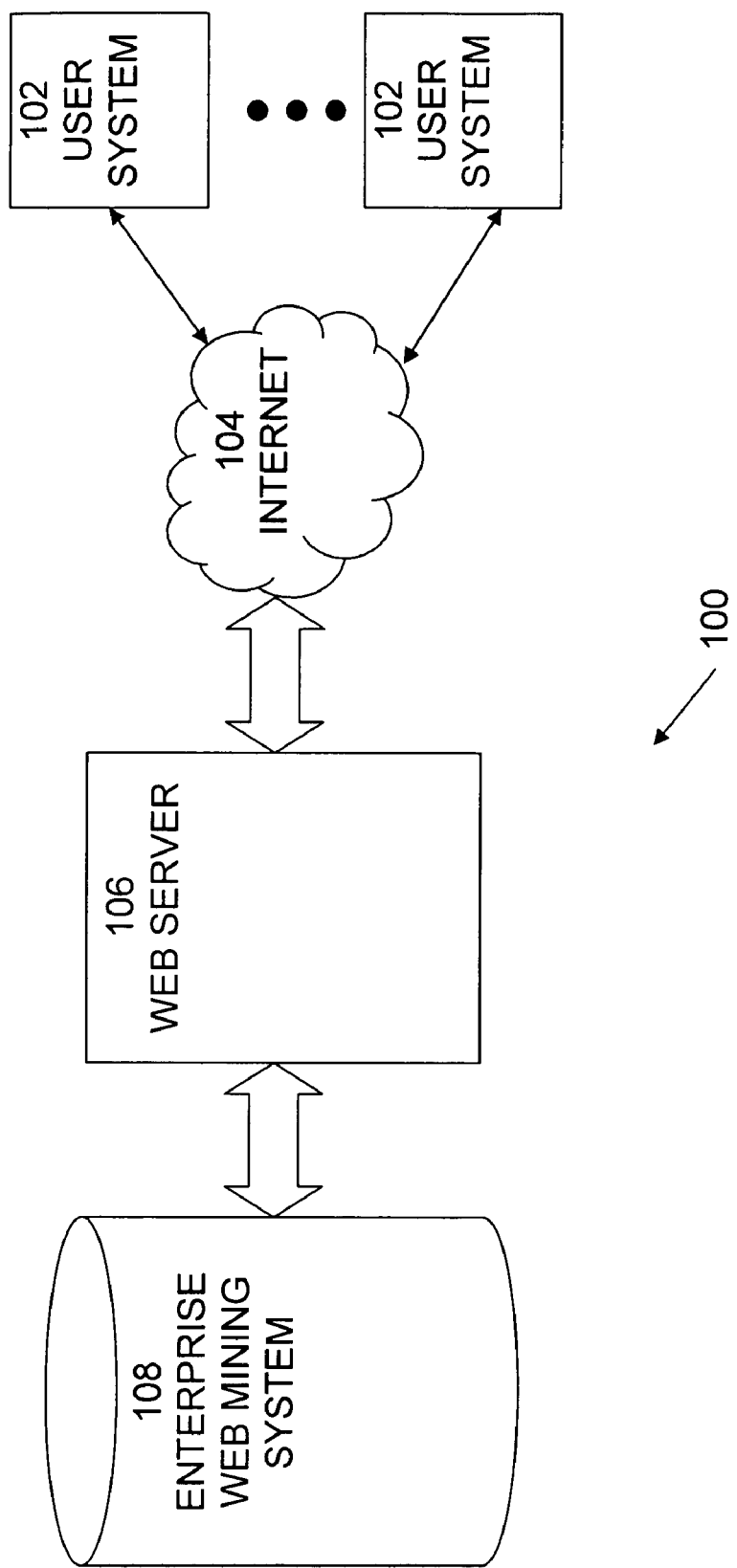
FIG. 1 is an exemplary block diagram of a system incorporating the present invention.

An exemplary block diagram of a system 100 incorporating the present invention is shown in FIG. 1. System 100 includes a plurality of user systems 102, such as personal computer systems operated by users, which are communicatively connected to a data communications network, such as the Internet 104. User systems 102 generate and transmit requests for information over Internet 104 to Web server 106. Typically, the requests for information are generated by browser software running on user systems 102 in response to input from users. The requests for information are received by Web server 106, processed, and responses, typically including the requested information, are transmitted from Web server 106 to the user systems. Data mining/data processing system 108 is communicatively connected to Web server 106 and receives information relating to the requests for information received by Web server 106 from the user systems 102. The information received by system 108 may include the actual requests themselves, it may include other information relating to the requests that has been processed or generated by Web server 106, or it may include requests for information generated by Web server 106 itself. System 108 processes the received information and responds appropriately. For example, if the received information is requests from user systems 102 or information relating to those requests, system 108 may store the information in a data base and/or perform data mining in a database to extract appropriate information. Likewise, if the received information is requests for information generated by system 106, system 108 will typically perform data mining in a database to extract information responsive to the requests.

Figure 2:
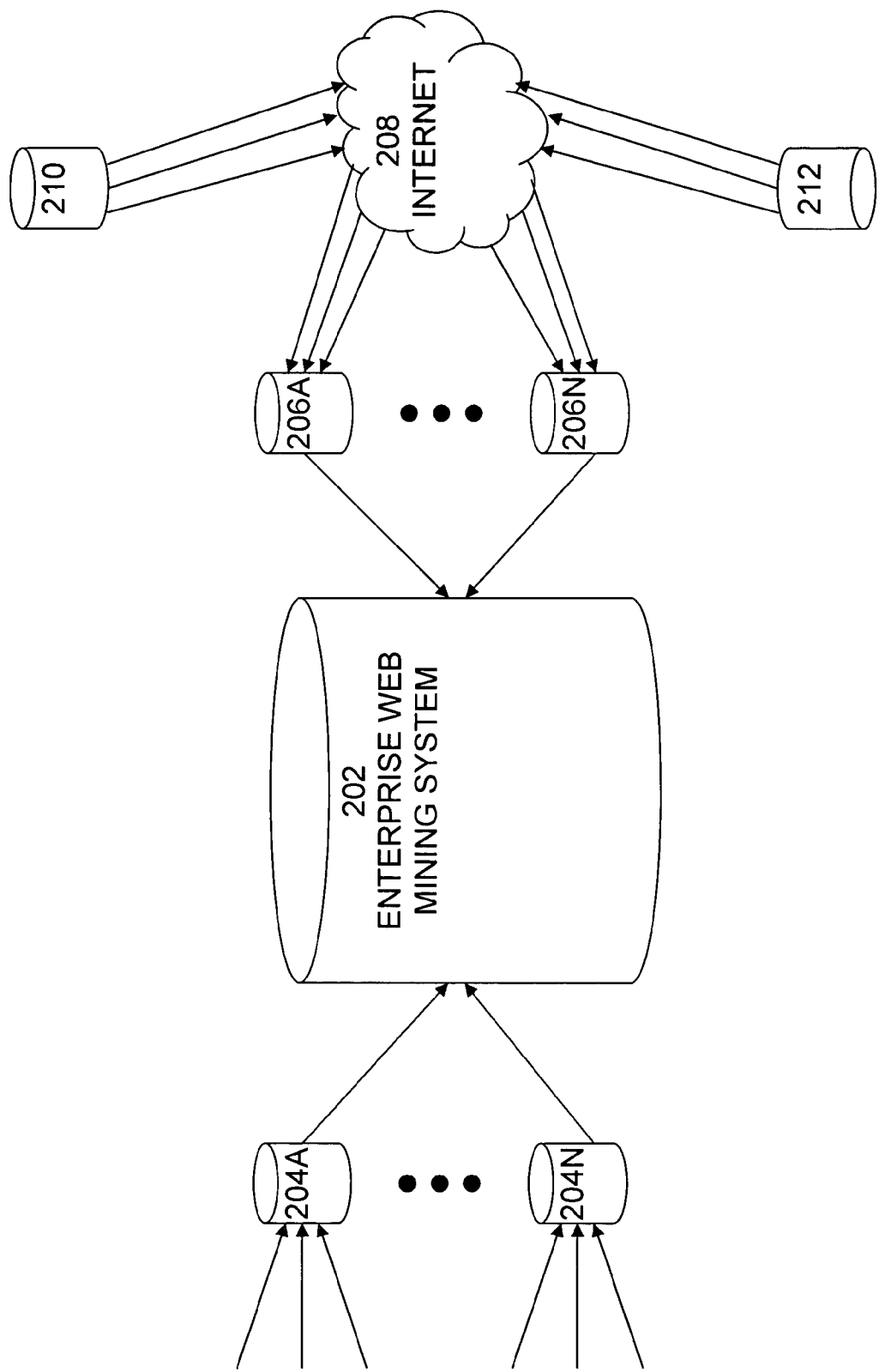
FIG. 2 is an exemplary block diagram of a system incorporating the present invention.

Traditionally data mining has been applied to corporate databases where customer data and transactions are quite structured and well defined. The Internet changes everything with the emergence of a new and complex environment that embodies enterprise data ranging from dynamic click stream data from web portals and search engines to ever-growing E-commerce sites all the way to traditional corporate warehouses. The present invention uses an extended approach to data mining suitable to address business problems in this new environment. To achieve this goal the present invention spans the full spectrum of data mining needs from pure web e-commerce to traditional corporation and businesses, as shown in FIG. 2. As shown in FIG. 2, the present invention includes a data mining/data processing system 202 that is connected to a variety of sources of data. For example, system 202 may be connected to a plurality of internal or proprietary data sources, such as systems 204A–204N. Systems 204A–204N may be any type of data source, warehouse, or repository, including those that are not publicly accessible. Examples of such systems include inventory control systems, accounting systems, scheduling systems, etc. System 202 may also be connected to a plurality of proprietary data sources that are accessible in some way over the Internet 208. Such systems include systems 206A–206N, shown in FIG. 2. Systems 206A–206N may be publicly accessible over the Internet 208, they may be privately accessible using a secure connection technology, or they may be both publicly and privately accessible. System 202 may also be connected to other systems over the Internet 208. For example, system 210 may be privately accessible to system 202 over the Internet 208 using a secure connection, while system 212 may be publicly accessible over the Internet 208.

The common thread to the systems connected to system 202 is that the connected systems all are potential sources of data for system 202. The data involved may be of any type, from any original source, and in any format. System 202 has the capability to utilize and all such data that is available to it.

Figure 3:
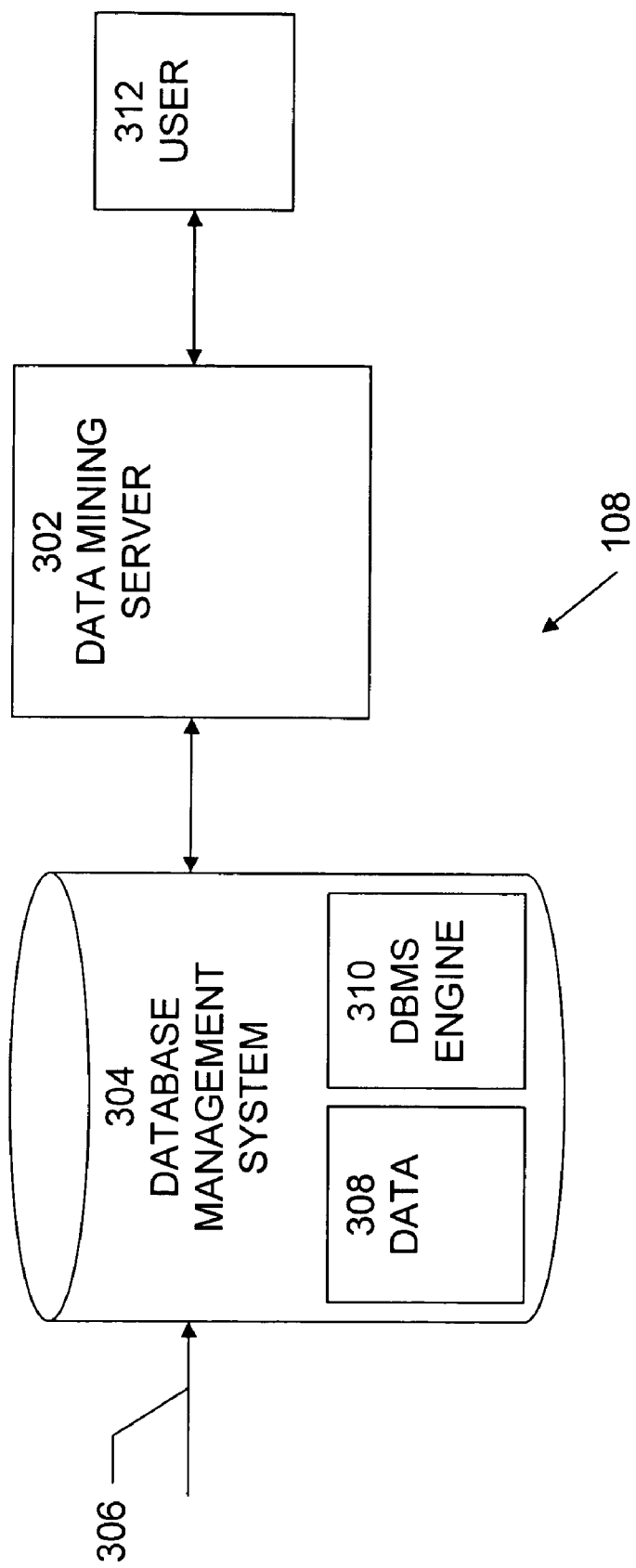
FIG. 3 is an exemplary block diagram of one embodiment of an enterprise web mining system, according to the present invention.

One exemplary embodiment of enterprise web mining system 108 is shown in FIG. 3. In the embodiment shown in FIG. 3, data mining server 302 is a separate system from database management system 304. Database management system 304 is connected to data sources 306, such as the proprietary and public data sources shown in FIG. 1. Database management system includes two main components, data 308, and database management system (DBMS) engine 310. Data 308 includes data, typically arranged as a plurality of data table, as well as indexes and other structures that facilitate access to the data. DBMS engine 310 typically includes software that receives and processes queries of the database, obtains data satisfying the queries, and generates and transmits responses to the queries. Preferably, DBMS engine 310 receives queries in the form of structured query language (SQL) statements. Data mining server 302 receives requests for data mining processed data from one or more users, such as user 308, processes the requests for data, generates and transmits database queries to database management system 304, receives responses to the queries, processes the queries, and transmits responses to the users.

Figure 4:
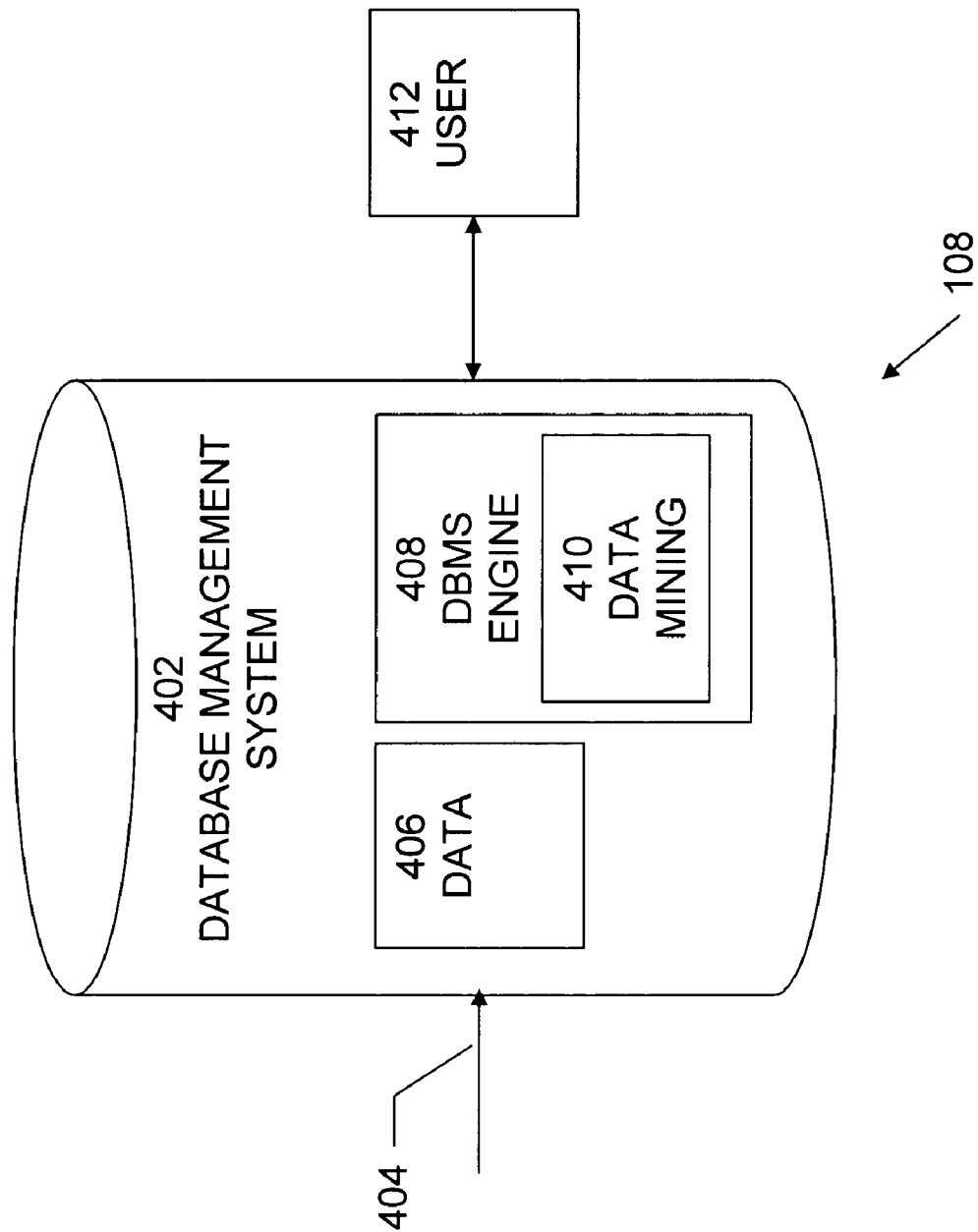
FIG. 4 is an exemplary block diagram of one embodiment of an enterprise web mining system, according to the present invention.

Another exemplary embodiment of enterprise web mining system 108 is shown in FIG. 4. In the embodiment shown in FIG. 4, data mining functionality is included in database management system 402. Database management system 402 is connected to data sources 404, such as the proprietary and public data sources shown in FIG. 1. Database management system includes two main components, data 406, and database management system (DBMS) engine 408. Data 406 includes data, typically arranged as a plurality of data table, as well as indexes and other structures that facilitate access to the data. DBMS engine 408 typically includes software that receives and processes queries of the database, obtains data satisfying the queries, and generates and transmits responses to the queries. DBMS engine 408 also includes data mining block 410, which provides DBMS engine 408 with the capability to obtain data and perform data mining processing on that data, so as to requests for data mining processed data from one or more users, such as user 412.

Figure 5:
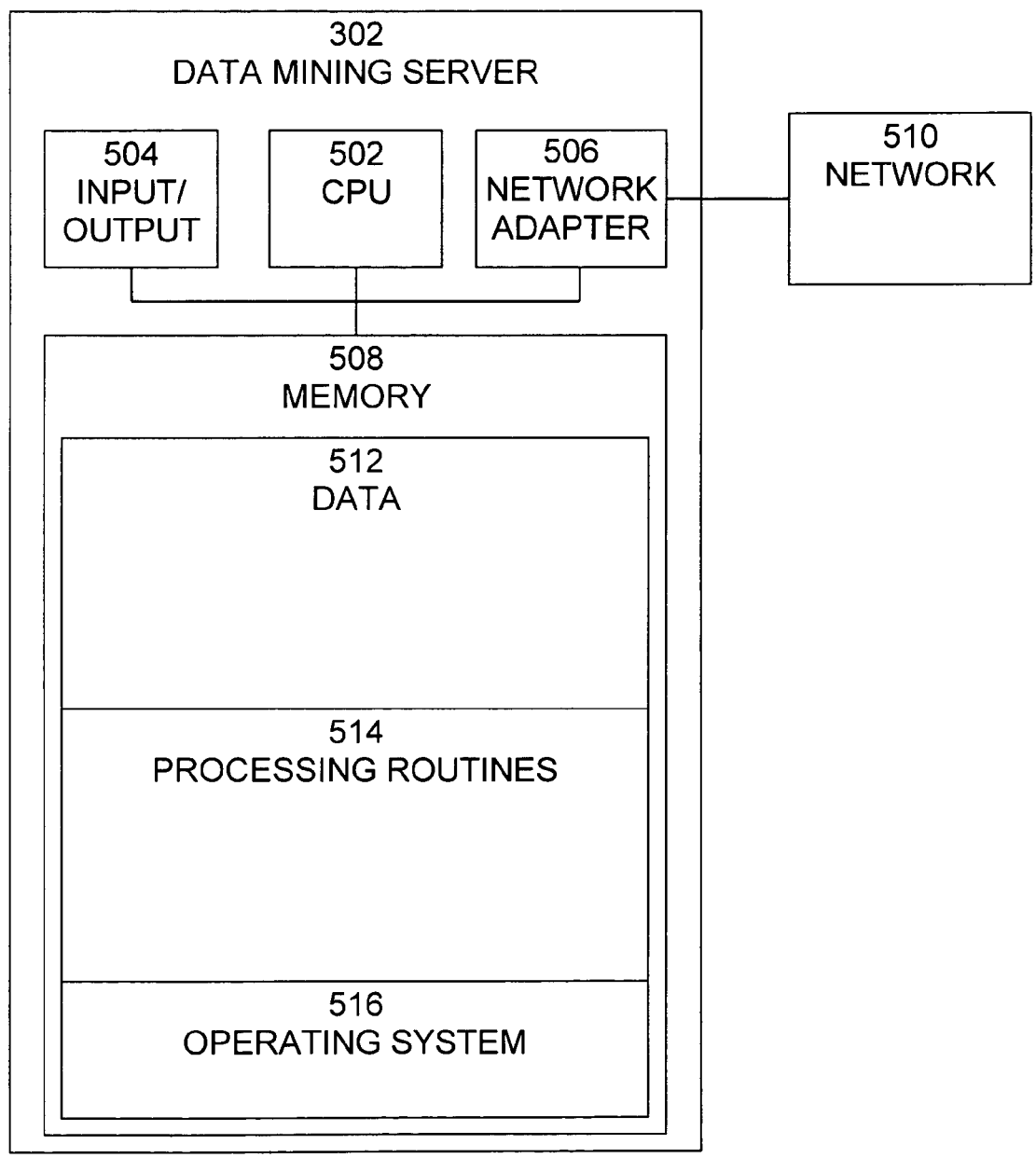
FIG. 5 is an exemplary block diagram of a data mining server shown in FIG. 3.

An exemplary block diagram of a data mining server 302, shown in FIG. 3, is shown in FIG. 5. Data mining server 302 is typically a programmed general-purpose computer system, such as a personal computer, workstation, server system, and minicomputer or mainframe computer. Data mining server 302 includes processor (CPU) 502, input/output circuitry 504, network adapter 506, and memory 508. CPU 502 executes program instructions in order to carry out the functions of the present invention. Typically, CPU 502 is a microprocessor, such as an INTEL PENTIUM® processor, but may also be a minicomputer or mainframe computer processor. Input/output circuitry 504 provides the capability to input data to, or output data from, data mining server 302. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces data mining server 302 with network 510. Network 510 may be any standard local area network (LAN) or wide area network (WAN), such as Ethernet, Token Ring, the Internet, or a private or proprietary LAN/WAN.

Memory 508 stores program instructions that are executed by, and data that are used and processed by, CPU 502 to perform the data mining functions of the present invention. Memory 508 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 508 includes data 512, processing routines 514, and operating system 516. Data 512 includes data that has been retrieved from database management system 304, shown in FIG. 3, and which is used for data mining functions. Processing routines 514 are software routines that implement the data mining processing performed by the present invention. Operating system 520 provides overall system functionality.

Figure 6:
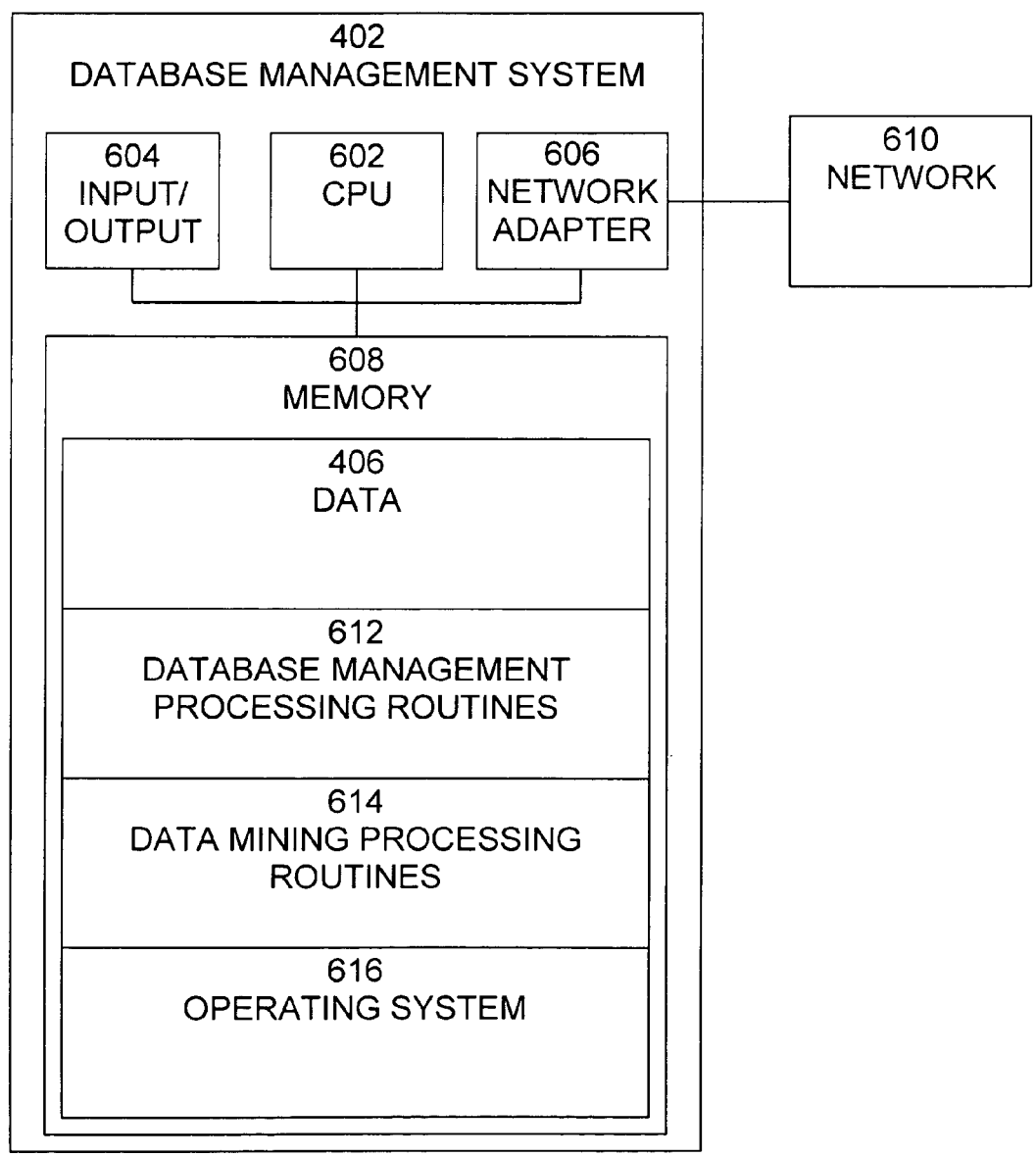
FIG. 6 is an exemplary block diagram of a database management system shown in FIG. 4.

An exemplary block diagram of a database management system 402, shown in FIG. 4, is shown in FIG. 6. Database management system 402 is typically a programmed general-purpose computer system, such as a personal computer, workstation, server system, and minicomputer or mainframe computer. Database management system 402 includes processor (CPU) 602, input/output circuitry 604, network adapter 606, and memory 608. CPU 602 executes program instructions in order to carry out the functions of the present invention. Typically, CPU 602 is a microprocessor, such as an INTEL PENTIUM® processor, but may also be a minicomputer or mainframe computer processor. Input/output circuitry 604 provides the capability to input data to, or output data from, database management system 402. For example, input/output circuitry may include input devices, such as keyboards, mice, touchpads, trackballs, scanners, etc., output devices, such as video adapters, monitors, printers, etc., and input/output devices, such as, modems, etc. Network adapter 606 interfaces data mining server 202 with network 610. Network 610 may be any standard local area network (LAN) or wide area network (WAN), such as Ethernet, Token Ring, the Internet, or a private or proprietary LAN/WAN.

Memory 608 stores program instructions that are executed by, and data that are used and processed by, CPU 602 to perform the functions of the database management system 402. Memory 608 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 608 includes data 406, database management processing routines 612, data mining processing routines 614, and operating system 616. Data 406 includes data, typically arranged as a plurality of data table, as well as indexes and other structures that facilitate access to the data. Database management processing routines 612 are software routines that provide database management functionality, such as database query processing. Data mining processing routines 614 are software routines that implement the data mining processing performed by the present invention. Preferably, this data mining processing is integrated with database management processing. For example, data mining processing may be initiated by receipt of a database query, either in standard SQL or in the form of extended SQL statements. Operating system 620 provides overall system functionality.

Figure 7:
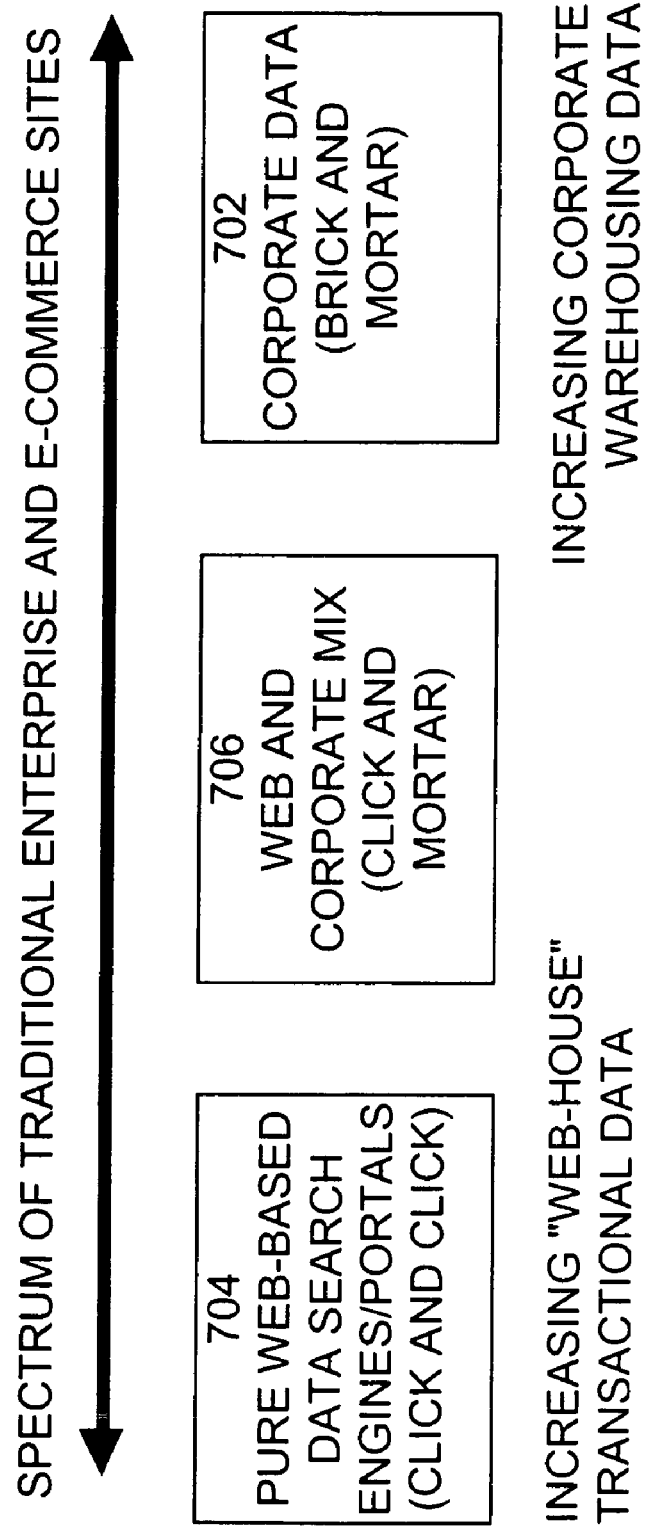
FIG. 7 is an illustration of the spectrum data used by web, e-commerce, and enterprise businesses.

An example of the spectrum data used by web, e-commerce, and enterprise businesses is shown in FIG. 7. Traditional brick and mortar enterprises 702 typically use large amounts of corporate warehousing data, but may have little or no web data in their databases. On the other side of the spectrum pure web-based businesses, such as web portals or search engines, store mainly web transactions and may have little or no corporate data. Most companies do not belong to either extreme but rather have a mix of web and corporate businesses 706 and so have both types of data: corporate warehouses and web transaction data.

One way to visualize the requirements and changes that a web enterprise or e-commerce site brings to traditional data mining is to imagine that a web site is a "virtual department store." It is different from a traditional department store in three ways:

i) users can be identified and in some cases tagged,
  ii) the exact browsing or buying path can be recorded, and
  iii) the structure of the store (virtual departments, nature of sales agents, etc) can be modified dynamically to customize it for each visitor.

Figure 8:
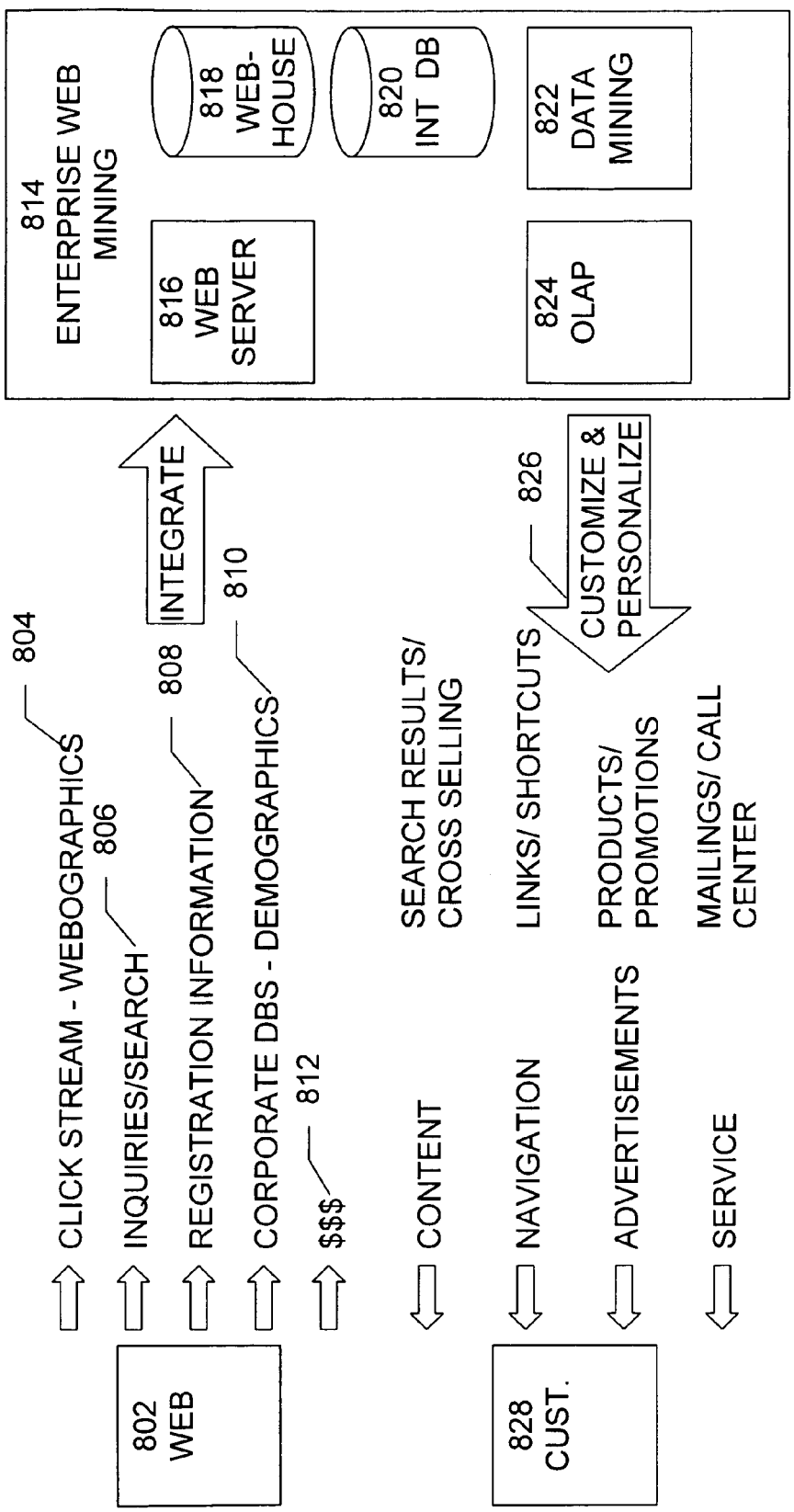
FIG. 8 is an exemplary diagram showing the flow of information in the present invention.

An exemplary diagram of the flow of information in the present invention is shown in FIG. 8. Information is gathered from the Web, from individual users behavior as well as specific requests for information, and from other sources. For example, the information that is gathered from the Web 802 includes click stream and webographics information 804, inquires and search requests 806, registration information 808, corporate database management system information and demographic information 810, and accounting information 812, such as monetary transactions, financial information, etc. This information is integrated and transmitted to enterprise web mining system 814. Enterprise web mining system 814 receives the integrated data at web server 816 and stores the data, as appropriate, in Webhouse 818 and/or internal database 820. Data mining engine 822 and online analytical processing (OLAP) functions 824 extract and analyze data stored in Webhouse 818 and internal database 820 and generate customized and/or personalized information 826 that is to be transmitted to a customer 828 or other user. Data mining engine 822 finds patterns that may be hidden in the data, while OLAP functions 824 provide multidimensional analysis of the data. Examples of the types of customized and personalized information that is generated include content of the selected Web pages, navigation among pages, advertisements, customer service information, search results, cross selling information, links, shortcuts, products, promotions, mailings and call center information.

Most data mining problems are addressed according to one of three paradigms: supervised learning, association analysis, and clustering. These paradigms have been applied to numerous problems in corporate and database mining such risk assessment, attrition and retention modeling, campaign marketing, fraud detection, customer profiling, profitability and cross-selling. These application problems are usually viewed from an account- or user-centric point of view. All the relevant information for each user is merged and consolidated in one record. An input dataset then looks like a large, mostly populated two-dimensional table where the columns correspond to attributes (independent variables). In the supervised learning approach, one particular column provides the 'target' that is used as the dependent variable for the Data Mining model. Association modeling attempts to find associations: common patterns and trends in a less structured way (i.e. independent of a particular target field). These associations are supported by statistical correlations between different attributes of the dataset and are extracted by imposing independence, support, and confidence thresholds. Association analysis is applied to transaction or market basket data typically. In this case the datasets consists of transaction data listing a basket or group of items corresponding to an individual sale. The dataset is again a two-dimensional table but in this case potentially very sparse. Clustering is used for data-reduction and for class discovery. It is a method to find general correlation structures that group records into similarity groups. Clustering can be applied to both account or transaction-based datasets. Most data mining tool-sets support algorithms that provide instances of these paradigms but it is not common to encounter the three paradigms in a single problem.

Enterprise web mining (EWM) in its most general realization involves a collection of data intensive data sources and repositories with corporate, warehousing and web-transaction components. As a consequence of this heterogeneity the present invention must incorporate these data sources in a way suitable to support the three learning paradigms and also allow the system to solve different types of mining problems along the spectrum of web enterprises shown in FIG. 3. On one side of the spectrum the present invention provides the capability to perform traditional data mining modeling on corporate RDBMS augmented by account-centric web data. For example, modeling of attrition in a phone company. On the other side of the spectrum the present invention provides the capability to perform pure transactional association analysis such as the one needed in sites such as search engines. Most web sites and corporate enterprises are somewhere in the middle.

Thus, the present invention provides the capability to

Extract session information from web server data.

Transform a web site visitor's behavior into data about his preferences.

Integrate web transactions and browsing behavior data with customer information and demographics Support a variety of mining problems (e.g., cross-selling, up-selling, market segmentation, customer retention, and profitability) that use as input web and corporate data.

Help discover interesting and relevant patterns, clusters, and relationships in the transaction and user customer data.

An important function performed by the present invention is to integrate many existing information gathering, storage and decision elements in a coherent way. In order to do this, the methodology in the integration process and in the user interface must be defined.

It is useful to distinguish three types of web mining. Web mining consisting of web-deployed traditional data mining provides the capability for web pages to use results of segmentation models for advertisements, cross-selling, etc. Web mining consisting of data mining of click stream data provide the capability to generate statistical usage reports, on-line personalized recommendations, and on-line personalized navigation and general content. Full-fledged Enterprise Web Mining, as provided by the present invention, provides the capability to integrate traditional mining and click stream and conceptual classes encompassing the entire corporate/web customer life-cycle, including acquisition, cross-selling, and retention. In addition, it provides the capability to implement a dynamically personalized virtual store with artificial intelligence sales agents.

Another important aspect of the present invention is the personalization application. The personalization application is an integrated software application that provides a way for a Web site to customize—or personalize—the recommendations it presents to Web site visitors and customers.

Recommendations are personalized for each visitor to the Web site. This has distinct advantages over tailoring recommendations to broad, general market segments. Recommendations are based on a visitor's data and activity such as navigational behavior, ratings, purchases, as well as demographic data.

The personalization application collects the data and uses it to build predictive models that support personalized recommendations of the form "a person who has clicked links x and y and who has demographic characteristics a and b is likely to buy z".

The personalization application incorporates visitor activity into its recommendations in real time—during the Web visitor's session. For example, the personalization application records a visitor's navigation through the Web site, noting the links that are clicked, etc. All this is data stored for that visitor. The visitor may respond to a Web site's request to rate something, e.g., a book or a movie; the rating becomes part of the data stored for that visitor. All the Web-based behavior for the visitor is saved to a database, where the personalization application uses it to build predictive models. This data can be updated with data collected in subsequent sessions, thereby increasing the accuracy of predictions.

The personalization application works in conjunction with an existing Web application. The Web application asks the personalization application to record certain activities, and the data is saved by the personalization application into a schema. The Web application asks the personalization application to produce a list of products likely to be purchased by a Web site visitor; a scored list of recommendations compiled from the visitor's current behavior and from data in another schema is passed to the Web application.

A third schema maintains administrative schedules and activities.

The personalization application collects four kinds of data:

navigational behavior ratings purchases demographic data

Of these, navigational behavior allows the most flexibility. It can represent anything the Web application wants to consider a hit (e.g., viewing a page, clicking a link/item, etc.).

Visitors to the Web site are of two types: registered visitors (customers) and unregistered visitors (visitors). For customers, the personalization application has both data from a current session and historical data collected over time for a given customer, as well as demographic data. For visitors, there is no historical data, so recommendations are based on current session behavior and demographic data, if available.

Preferably, the personalization application collects the data using Java calls provided by the REAPI (Recommendation Engine Application Programming Interface). These calls add information to the recommendation engine cache for the specific session, identified by a session ID. The recommendation engine finds the correct session ID by looking up one of the following arguments passed in the REAPI calls: appSessionID—used by sessionful Web applications (that is, an application that stores an identifier for each session) customerID—used by sessionless Web applications (that is, an application that does not store an identifier for each session) In more detail: The data collected are temporarily stored in a dual buffer cache in the JServ (Java server). Periodically the JServ buffer is flushed and the data are sent to the appropriate recommendation engine schema. The session data are then used, combined with historical data, to generate recommendations. Finally, the recommendation engine instance periodically flushes the data to the mining table repository (MTR) for sessions that have concluded or timed out. The recommendation engine only flushes data to the MTR with the data source types specified by its configuration parameters. The data in the MTR is then used to build predictive models for future deployment.

Some Web applications are sessionful, i.e., they create a session for each user visit to the Web site. Others are sessionless (stateless), i.e., they do not create sessions. Regardless of whether the calling Web application is sessionful or sessionless, the personalization application is always sessionful; the personalization application always creates a session internally and maps that session to the Web site's session if there is one. During the personalization application session, the Web application can collect data and/or request recommendations.

The personalization application uses the data to build data mining models. The models predict what the Web site visitor will probably like or buy. The predictions are based on the data collected for that Web site visitor in previous sessions, in the current session, and on demographic information. The personalization application Administrator defines a package that contains information needed to build a model or models, as well as information about the database connections. The personalization application Administrator creates and manages schedules for building the packages, and for deploying the packages to the recommendation engines (REs) that will produce the recommendations. Recommendation engines with the same package are grouped together in recommendation engine farms (RE Farms). These and related terms are defined more fully in the next section.

The personalization application uses a variety of data mining algorithms, depending on the type of recommendation requested by the web application. Two algorithms that are particularly useful are algorithms that are based on a theorem of Bayes concerning conditional probability. These algorithms are described below.

Figure 9:
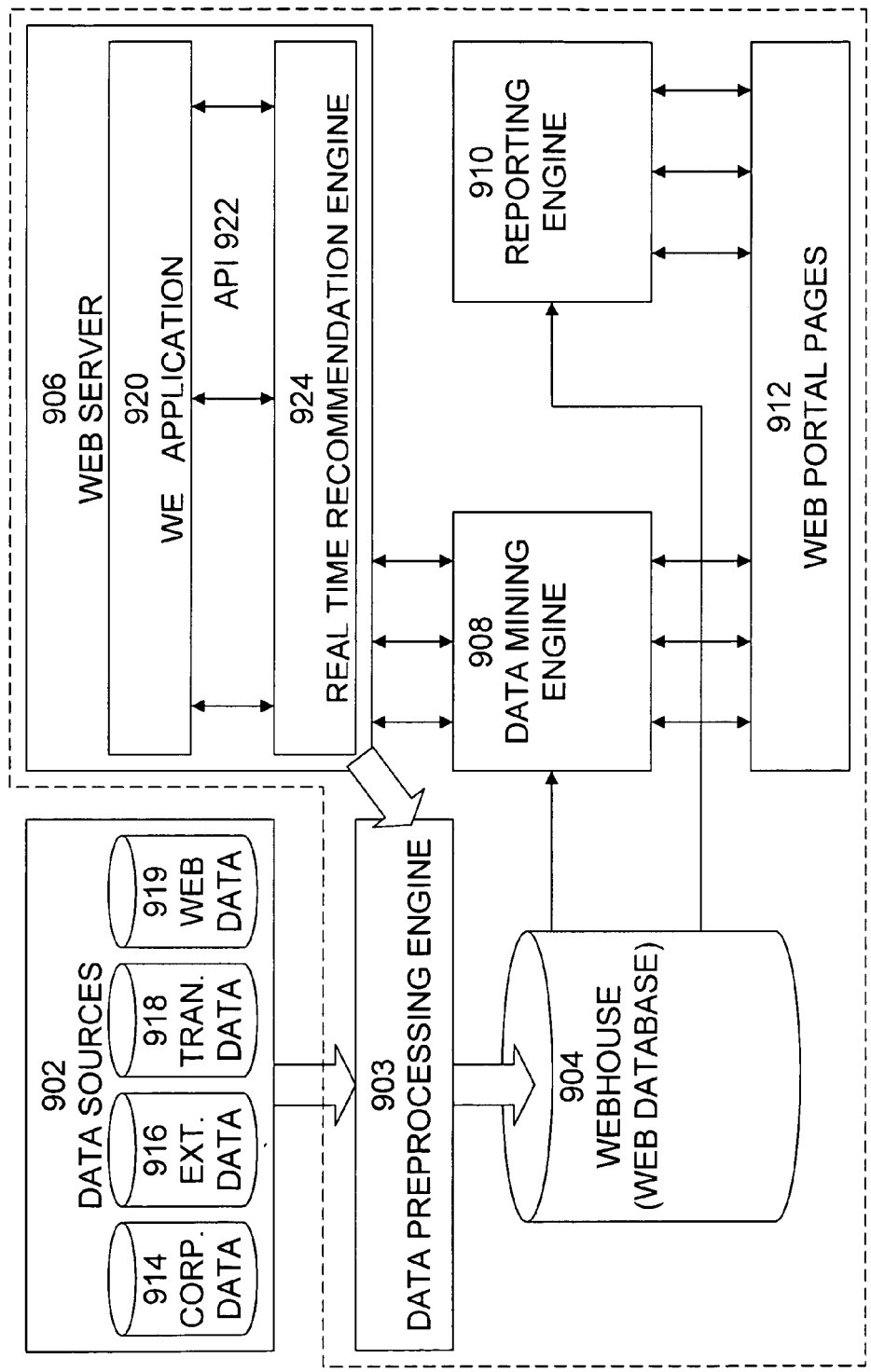
FIG. 9 is an exemplary block diagram of one embodiment of an enterprise web mining system, according to the present invention.

An exemplary block diagram of one embodiment of an enterprise web mining system 900, according to the present invention, is shown in FIG. 9. FIG. 9 is an example of physical and logical components that are combined to form the enterprise web mining system of the present invention. System 900 includes a plurality of data sources 902, a data preprocessing engine 903, a webhouse or web data warehouse 904, a web server 906, a data mining engine 908, a reporting engine 910, and web portal pages 912. Data sources 902 include corporate data 914, external data 916, Web transaction data 918, and Web server data 919. Corporate data 914 include the traditional proprietary corporate database or data warehouse that stores account- or user-based records. For example the name, age, amount of service or merchandise bought, length of time since initial creation, etc. External data 916 includes complementary data such as external demographics and other data acquired from external sources. Web transaction data 918 includes data relating to transactions, such as purchases, information requests, etc., which have been completed over the Web. Web data 919 includes Web traffic data from TCP/IP packet sniffing (live data collection), data obtained by direct access to the Web server's API, and Web server log files.

Webhouse 904 is built using any standard large-scale relational database system, such as ORACLE8I®. Specially designed schemas support the mining process and efficient reporting of web site activity. The Webhouse stores the data mining data, which are typically organized in data tables that used for building data mining models. Web server 906 may be based on any standard Web server, such as APACHE®, NSAPI®, and ISAPI®. Web server 906 has been enhanced to include web applications 920, application program interface 922, and real time recommendation engine 924. Web applications 920 may include any application that can use API 922 to collect data and request recommendations from real time recommendation engine 924. API 922 is a set of routines, protocols, and tools that are used by Web applications 920. The API functionality can be divided in two groups: data collection and pre-processing and real time recommendation. Real time recommendation engine 924 provides real time recommendations (predictions) using the models built off line by data mining engine 908. Real time recommendation engine 924 also provides the capability to collect real-time data from web applications 920. Web applications 920 communicate with real time recommendation engine 924 through API 922.

Data preprocessing engine 903 provides the extraction and transformation components, which extract data from web logs and other corporate information sources and transform it into a form suitable for data mining model construction. There are several main sub-components of data preprocessing engine 903. The mapping and selection component reads corporate database tables, such as those from corporate data sources 914, and maps specific fields into the account-based mining tables The web data transformation component reads raw log files, and optionally transaction summaries, from external data sources 916, and converts them into the transaction-based mining schema (TBMS) used by present invention. The web data transformation component also performs semantic analysis and keyword extraction on the original and converted web data to produce conceptual tables, concept-based mining schema (CBMS).

Data mining engine 908 may be based on any standard data mining technology, such as the ORACLE DARWIN 4.0® data mining engine. Data mining engine 908 generates data mining models using several machine learning technologies. Each machine learning technology is embodied in one or more modules that provide the model building functionality appropriate to each mode. Preferably, the supported machine learning technologies include: Naïve Bayes modeling, Association rules, and decision tree models for the creation of inductive models. Naïve Bayes models provide the capability of fast incremental learning. Decision trees of the classification and regression tree (CART) type provide transparent and powerful on-line rules and may be batch trained. In addition, a self organizing map clustering module provides the capability to address segmentation and profiling. The supported web mining methodologies provide the capability to perform a wide range of end-use functions. For example, the present invention may support the on-line customer lifecycle, which includes elements such as customer acquisition, customer growth, customer retention and lifetime profitability. Additional examples include click through optimization or web site organization.

Reporting engine 910 provides a variety of reports and results summaries, such as site statistics, browser to buyer conversion by time period, recommendation effectiveness by time period, most active cross-sold products by time period, and products for cross-selling by product.

Web portal pages 912 provides a main graphical user interface (GUI) and access to all the components of the system. Web portal page 912 is structured as a collection of portlets that serve as entry points to the main components. Each component in turn has a main page where the main operations and parameters are exposed as part of the web page content. In these components pages customization is available, for example by "check box" selection. Aspects of a web site's personalization process are managed through the portal pages 912, which are implemented with a GUI and interface with the other major components.

Framework

Figure 10:
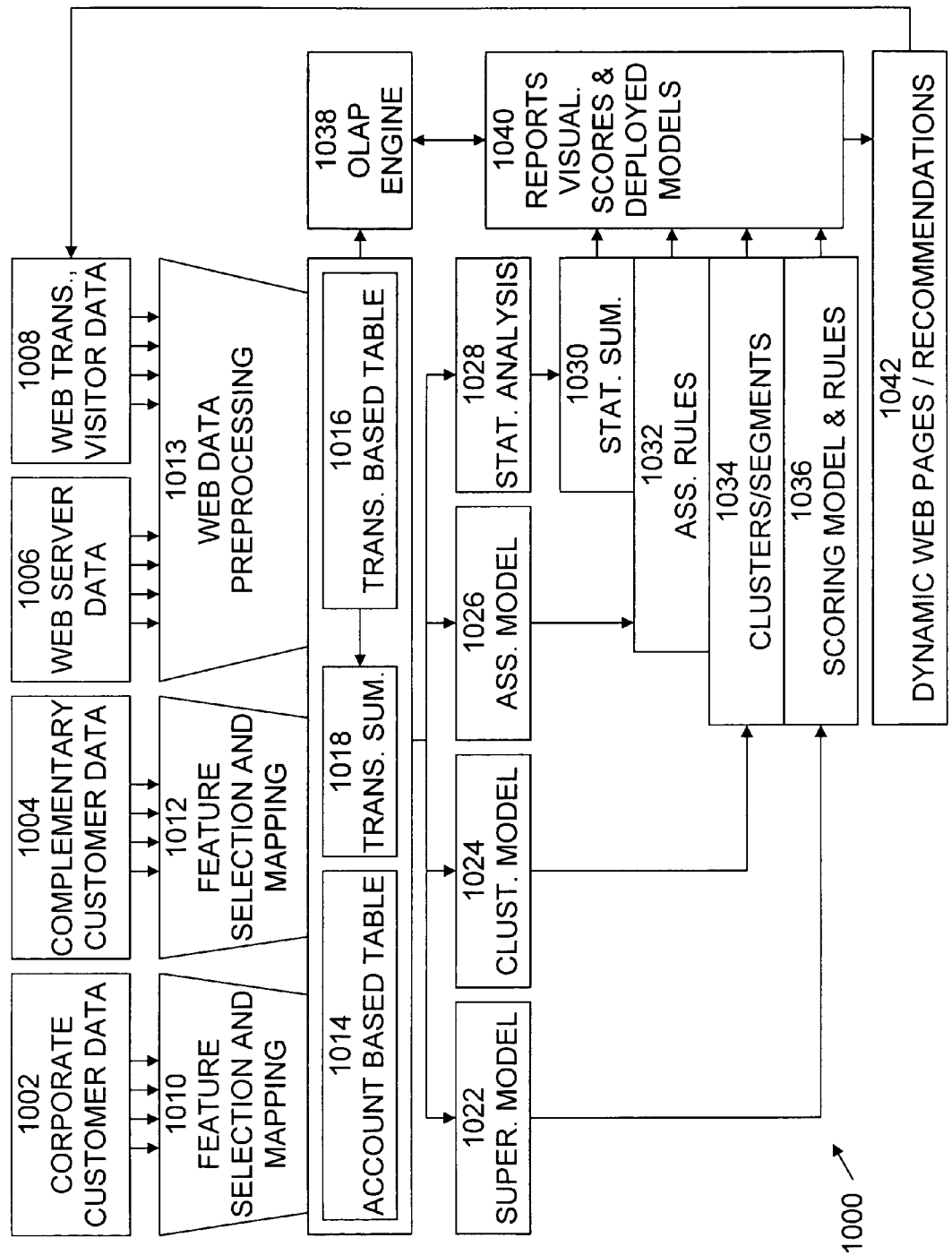
FIG. 10 is an exemplary block diagram of a methodological and technical framework implemented in the system shown in FIG. 9.
Figure 11:
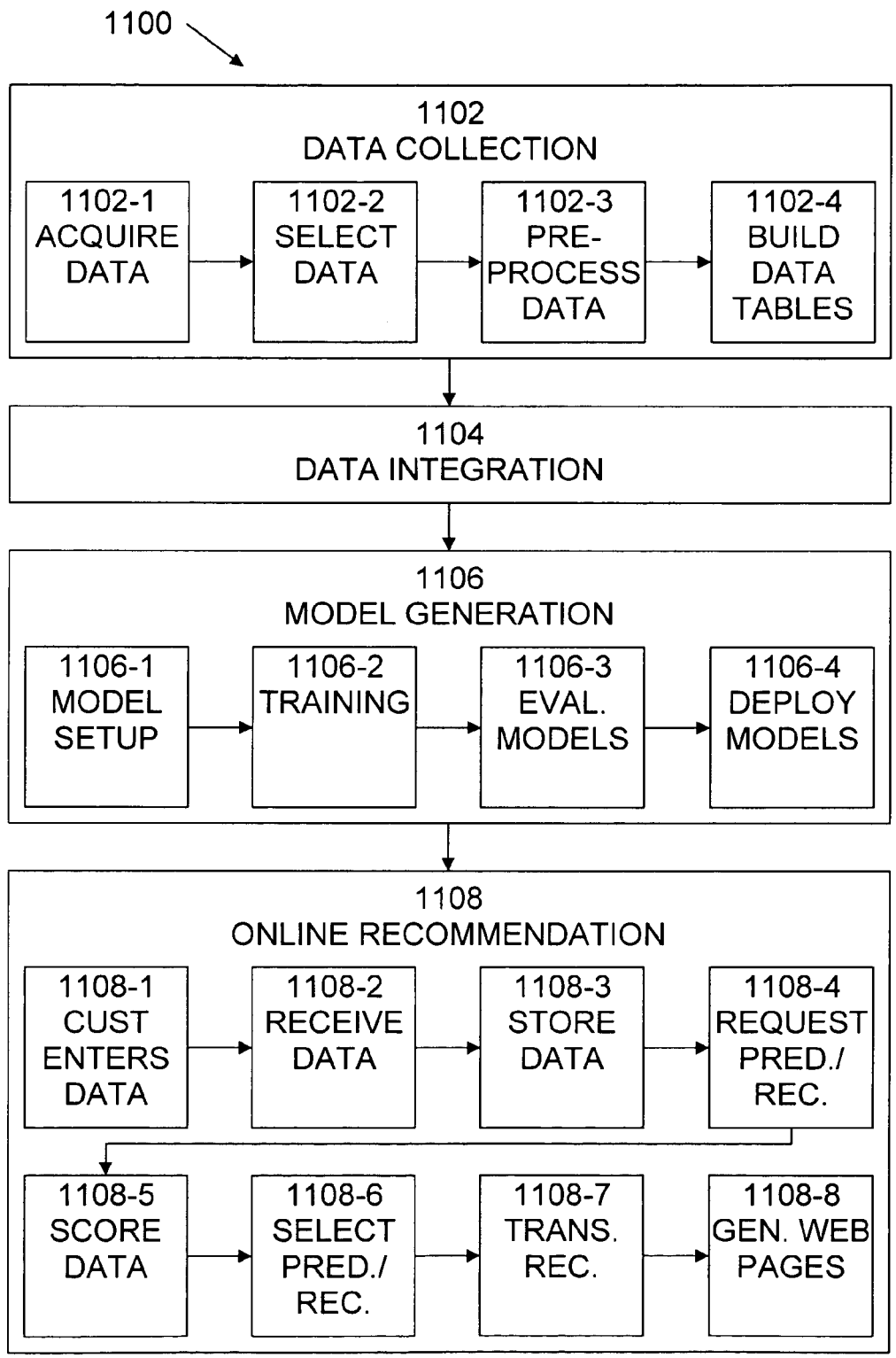
FIG. 11 is an exemplary flow diagram of a process for enterprise web mining implemented in the framework shown in FIG. 10.

FIGS. 9, 10, and 11 illustrate different aspects of the present invention and are best viewed in conjunction. FIG. 9 is an example of physical and logical components that are combined to form the enterprise web mining system of the present invention. FIG. 10 is an example of the data flow in the enterprise web mining system of the present invention. That is, FIG. 9 represents the physical and logical components that make up the enterprise web mining system, while FIG. 10 represents the data stored in and generated by, and the processing performed by, the physical and logical components shown in FIG. 9. FIG. 11 is a flow diagram of the processing performed by the physical and logical components shown in FIG. 9. This processing is also illustrated in FIG. 10.

Referring to FIG. 10, which is an exemplary data flow diagram of the methodological and technical framework of the enterprise web mining system 1000, implemented in the system shown in FIG. 9, system 1000 includes a plurality of data sources, such as corporate customer data 1002, which is typically provided by corporate database 914, complementary or external customer data 1004, which is typically provided by external databases 916, web server data 1006, which is typically provided by web database 919, and web transaction and visitor data 1008, which is typically provided by web transaction database 918. System 1000 includes a plurality of data processing blocks, such as feature selection and mapping blocks 1010 and 1012 and web data preprocessing block 1013, which are typically implemented in data preprocessing engine 903. System 1000 includes a plurality of data tables, such as account based table 1014, transaction based table 1016, and transaction summary table 1018, which are typically stored in webhouse 904. System 1000 includes a plurality of untrained data mining models, such as supervised learning model 1022, clustering model 1024, association model 1026, and statistical analysis model 1028, which are typically processed (trained) by data mining engine 908. System 1000 includes a plurality of trained data mining models, such as statistical summaries 1030, association rules 1032, clusters/segments 1034, and scoring models and rules 1036, as well as reports, visualizations, scores and deployed models that are included in block 1040. The trained data mining models are typically processed by data mining engine 908, which generates the deployed models in block 1040. The deployed models are used by real time recommendation engine 924 to generate dynamic web pages, predictions, and recommendations 1042. The reports in block 1040 are typically generated by reporting engine 910. Other online processing is performed by online analytical processing (OLAP) engine 1038.

Turning now to FIG. 11, which is an exemplary flow diagram of a process 1100 for enterprise web mining, which is implemented in the framework shown in FIG. 10. The four main steps of process 1100 are data collection 1102, data integration 1104, model generation 1106, and online recommendation 1108. FIGS. 10 and 11 will be described together and are best viewed in conjunction. Reference will also be made to physical and logical elements of FIG. 9. Process 1100 begins with step 1102, in which data is collected and processed to generate data in a form usable by the remaining steps of process 1100. Step 1102 includes a plurality of steps. Step 1102 begins with step 1102-1, in which data is acquired from the data sources with which system 1000 operates, such as data sources 902, shown in FIG. 9. The data sources include corporate database 914, which provides corporate customer data 1002, external databases 916, which provides complementary customer data 1004, Web transaction database 918, which provides web transaction and visitor data 1008, and Web server database 919, which provides web server data 1006. The data obtained from the data sources is represented as blocks 1002, 1004, 1006, and 1008 of system 1000. In step 1102-2, data that is relevant to the desired output from the system is selected from among the data that has been acquired. In step 1102-3, the selected data is pre-processed to ensure that the data is usable, properly formatted, etc. The processing performed in steps 1102-2 and 1102-3 is represented by blocks 1010, 1012, and 1013 of system 1000 and is typically performed by data preprocessing engine 903. In step 1102-4, the data tables that are used by the system, such as tables 1014, 1016, and 1018 of system 1000, are built and typically are stored in webhouse 904.

Step 1104 of process 1100 involves integrating the different types of data that have been collected to form an integrated database that contains all collected data in a coherent format. For example, web based data may be integrated with account based data for each user. Likewise, data for different types of users, who have different amounts and types of data, may be integrated. The integrated data formed includes account based tables 1014, transaction based tables 1016 and transaction summaries 1018. This data is typically stored in webhouse 904.

Step 1106 of process 1100 involves generating and deploying the models that are used to perform online recommendation and prediction. The processing of step 1106 is typically performed by data mining engine 908. Step 1106 includes a plurality of steps. Step 1106 begins with model setup step 1106-1, in which the algorithms that are to be used to generate the models are selected and setup. Once the algorithms and corresponding data structures are selected and setup, they may be viewed as untrained models, such as models 1022, 1024, 1026, and 1028. In step 1106-2, the representations that make up the trained models, such as information defining the logic, conditions, and decisions of the models, are generated using training data. These trained models may include statistical summaries 1030, association rules 1032, clusters/segments 1034, and scoring models and rules 1036. In step 1106-3, the representations of the generated models, such as blocks 1030, 1032, 1034, and 1036 of system 1000, are evaluated and refined to improve the quality of the model. In step 1106-4, the evaluated models are encoded in an appropriate format and deployed for use, such as in block 1040.

Step 1108 of process 1100 involves generating online recommendations in response to actions of an online user. The processing of step 1108 is typically performed by real time recommendation engine 924. Step 1108 includes a plurality of steps, which are described below.

Steps 1102, 1104, 1106, and 1108 will now be described in greater detail:

Data Collection

Data collection, step 1102 of process 1100, includes the acquisition 1102-1, selection 1102-2, pre-data mining processing of data 1102-3, and building of data tables 1102-4 that are to be used in the web mining process implemented in system 1000. Among the data sources that are utilized are corporate customer data 1002, complementary or external data 1004, Web server data 1006, and Web transaction and visitor data 1008. Corporate customer data 1002 includes the traditional corporate database or data warehouse that stores account- or user-based records. For example the name, age, amount of service or merchandise bought, length of time since initial creation, etc. Complementary data 1004 includes complementary data such as external demographics and other data acquired from external sources.

Web server data 1006 includes Web traffic data from TCP/IP packet sniffing (live data collection), data obtained by direct access to the Web server's API, and Web server log files. TCP/IP packet sniffing provides live data collection by monitoring the TCP/IP packets sent to and from a Web server. This technology has several benefits over traditional log files For example, packet sniffing can provide real time data collection, it can capture information not found in log files, such as 'POST' variables, 'HOST' headers, etc., and it can support any Web server because it is independent of log file format and underlying operating system. Direct Access to a web server's API is necessary for sites using SSL encryption. TCP/IP packet sniffing in this case is not useful because the packets are encrypted. A Web server log files is the most basic information kept by most web servers. A Web server log file is typically a text file (ASCII) where each line contains information about which computer made each request to the server and which file was requested. Log files may include a variety of fields, such as Internet provider IP address, an identification field, an authenticated username that a visitor needs to gain access to a protected area, a date, time and Greenwich Mean Time (GMT) of the transaction, the transaction method, such as 'GET', 'POST' or 'HEAD', followed by the filename involved in the transaction, a status or error code from the Web server, the number of bytes transferred to the client during the request, the page and site that the visitor was on at the time he made the request, a code identifying the browser and operating system used to make the request, and any cookie information from the browser.

Different Web servers store this information in different formats. Some popular servers that may interoperate with the present invention include APACHE®, LOTUS DOMINO®, MICROSOFT INTERNET SERVER (IIS)®, NETSCAPE SUITESPOT®, and O'REILLY WEBSITE®.

Web transaction data 1008 includes transaction data from website sessions and visitors.

Feature selection and mapping blocks 1010 and 1012 perform the basic mapping between general attributes and particular features present in corporate database tables. Features of the corporate database tables are selected based on their relevance and/or necessity to the desired output. The selection of database features may be straightforward, or a machine learning algorithm, such as Naïve Bayes, or statistical analysis, such as Logistic Regression, may be used to select the most relevant features. The selection of particular relevant features is very important to reduce the dimensionality of the datasets used in the data mining processing. The application of feature selection to both primary corporate RDB 1002 and complementary RDB 1004 is similar.

Examples of data mining tables that are built by the data collection process are account based table 1014, transaction based table 1016, and transaction summary table 1018. The structure of these tables is described below. There are two basic strategies to build the mining tables that are based on Web data: Web data pre-processing and Pre-defined data collection. Web data pre-processing is performed by Web data pre-processing block 1013. One of the key elements that distinguishes Web mining from other data mining activities is the method used for identifying visitor transactions and path completion. As a consequence an important element of the system is the pre-processing and transaction record derivation from web server access logs. Web access data is not necessarily transaction-based and can be extremely noisy and fine grained (atomic). The Web data pre-processing performed by block 1018 includes: data cleaning, visitor identification, session reconstruction, classification of web pages into navigation and content pages, path completion, and converting file names to page titles.

Data cleaning involves removing redundant or irrelevant information from Web server log files, which are often are very redundant. Data cleaning is necessary before extracting useful information from log files.

Visitor identification, which is identification of a visitor to a web site, is typically done using the computer IP address since all requests to a Web server include this information. This is not a perfect technique because multiple visitors can share the same IP address, a practice used by large organizations and many Internet service providers. More accurate visitor identification can be obtained from cookies and authenticated user-names.

A session may be reconstructed by compiling the set of URL requests made by a visitor during a short period of time.

Path completion is the process of reconstructing the particular path followed by a given visitor in one session. This is usually done linking log file entries in a session and sorting the entries by time. Path analysis of a whole site can offer valuable insights such as: most traveled paths, and navigational problems. File names may be converted to page titles at the pre-processing stage. The file names of requested pages may often be converted to the associated page titles, since man web site will include a title (using the HTML <TITLE> tag) for each page. Likewise, IP addresses may be converted to domain names. Each entry in a Web server log file includes the visitor's IP address. These numbers in themselves are not very informative. However a visitor's IP address can be converted to a unique domain name using the Domain Name System (DNS). Finally, it is possible to estimate where visitors live by analyzing the extension of a visitor's domain name. Some extensions include: .au (Australia), .br (Brazil), and .uk (United Kingdom).

Rather than pre-processing existing web log files and other clickstream records to produce mining tables, predefined items that are passed by the web server pages as part of a data collection API may be collected. Under this approach, a given item (URL, banner, product ad etc.) will appear in a model only if that item has been predefined by the user in advance. In this model, the pre-processing is greatly simplified because the system can collect information and update mining tables without almost any processing. The burden is on the user in terms of predefining the web element of interest and in tracking the user session on-line and passing the major events (clicks on relevant items) to a data collection API. The extra work required from the user can be kept to a minimum if the API recommendation result object is constructed appropriately. For example, one of the attributes of the result object for a recommendation request can be the parameters required for the data collection API call. The advantage of this approach is that the system will work with almost any web server software that supports dynamical web pages (scripts) and will not rely on web analysis packages. The disadvantage is that the user has to provide and collect more information up front and that historical data cannot be readily used by the system. It is also possible to use historical clickstream data if adequate pre-processing of the data is implemented through consulting services.

Data Integration

Data integration, step 1102 of process 1100 involves integrating the different types of data that has been collected to form an integrated database that contains all collected data in a coherent format. One aspect of this is the generation of taxonomies, or systematic classifications, that group attributes in the data tables. This grouping increases the resolution power of the data mining models. Another aspect of data integration is the generation of profiles. For example, there are two main types of visitors to a Web site: unregistered visitors, termed browsers, and registered visitors, termed customers. While a web site has demographic and browsing data available on registered visitors, it only has browsing data on unregistered visitors. As a result, the two types of visitors necessitate different levels of data integration with customer accounts. Unregistered customers can be "profiled" based on their browsing behavior, such as keywords used, length of time, links selected, etc. This behavior can be recorded over multiple sessions and linked to external demographics and form information from similar registered customers. On the other hand, the information from registered customers can be more readily supplemented with external demographics in addition to browsing behavior.

Model Generation

Figure 12:
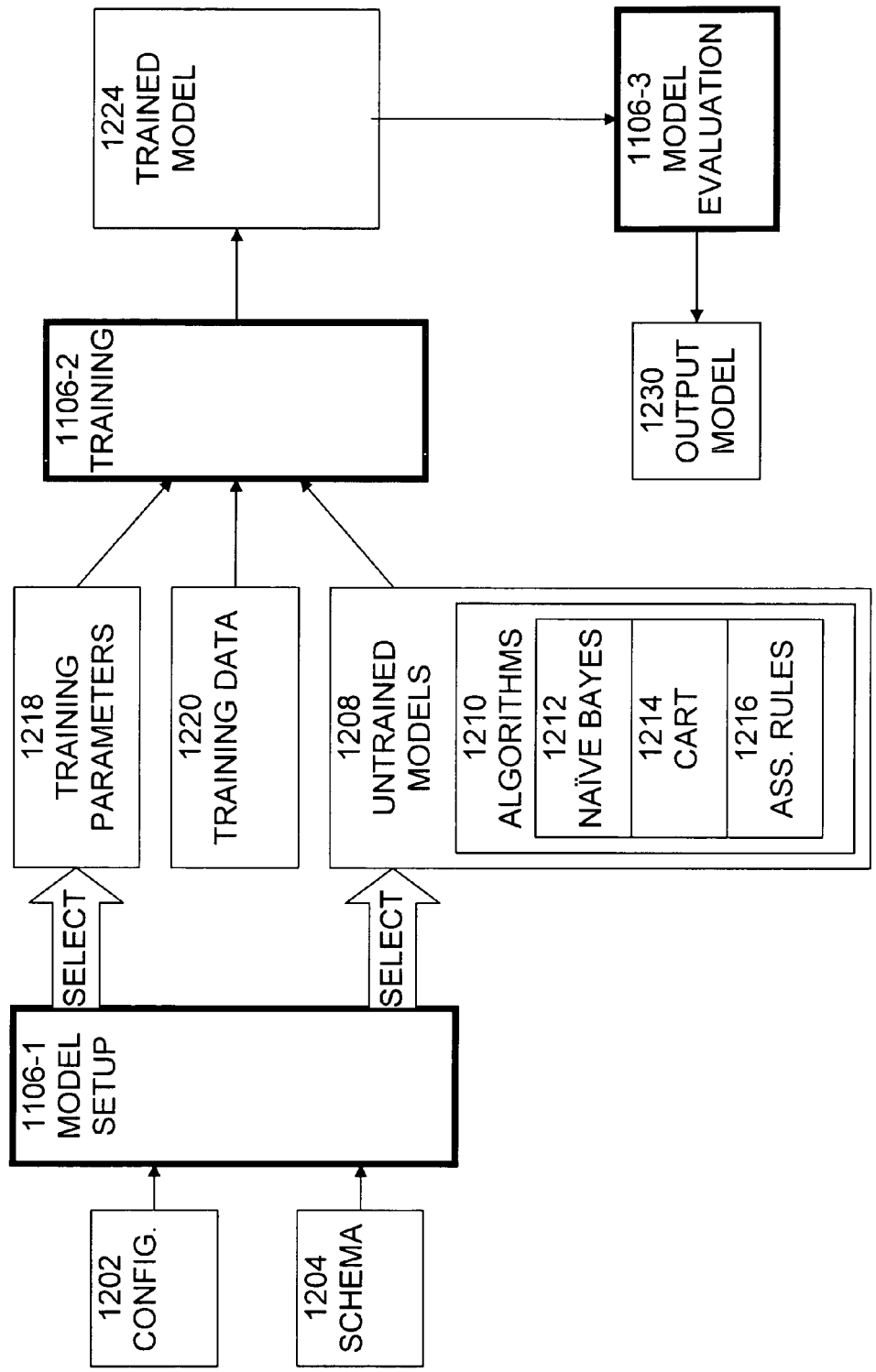
FIG. 12 is a data flow diagram of a model generation step shown in FIG. 11.

Model generation, step 1106 of process 1100, involves generating the models that are used to perform online recommendation and prediction. A data flow diagram of a model generation step 1106 is shown in FIG. 12. A configuration 1202 defines the information, such as items, products, attributes, etc. that are of interest for the user in a particular universe. A schema 1204 defines the types of models that are to be built in specific situations. The configuration 1202 and the schema 1204 are input to model setup step 1106-1, which sets up the models for training. In particular, model setup step 1106-1 selects the untrained models 1208 that are to be trained. Untrained models 1208 include algorithms 1210, which process the training data in order to actually build the models. For example, algorithms 1210 may include naïve Bayes algorithm 1212, classification and regression tree algorithm (CART) 1214, and association rules 1216. The algorithms that are to be used to build models are selected by model setup step 1106-1 based on the definitions in schema 1204. An example of such a schema is shown in Table A:

TABLE A

| Type of Data | Number of items | Algorithm |
| --- | --- | --- |
| Session (clickstream) | Small (<100) | Naive Bayes, CART and Association Rules |
| Session (clickstream) | Large (>100) | Naive Bayes and Association Rules |
| Account | Small or Large | Naive Bayes, CART and Association Rules |
| Account + Sessions Summary | Small (<100) | Naive Bayes, CART and Association Rules |
| Account + Sessions Summary | Large (>100) | Naive Bayes and Association Rules |
| All | Small (<100) | Naive Bayes, CART and Association rules |
| All | Large (>100) | Naive Bayes and Association rules |

In addition, model setup step 1106-1 generates and sets training parameters 1218. Training parameters 118 are parameters that are input to the algorithms to control how the algorithms build the models. Training data 1220 is data that is input to the algorithms that is used to actually build the models. Training parameters 1218, untrained models 1208, including the algorithms 1210 that were selected in model setup step 1106-1, and training data 1220 are input to training step 1106-2.

Training step 1106-2 invokes the selected algorithms 1210, initializes them using the training parameters 1218, processes training data 1220 the algorithms, and generates trained model 1224. Trained model 1224 includes representations that implement the logic, conditions, and decisions that make up an operational model. Trained model 1224 is input to evaluation step 1106-3, which evaluates and refines the model to improve the quality of the model. The refined model is output 1230 to be deployed by step 1106-4.

In step 1106-4, the output model 1230 are encoded in the appropriate format and are deployed for use in making predictions or recommendations.

In a preferred embodiment, two levels of model building settings are supported: function and algorithm. When the function level settings do not specify particular algorithm settings, an appropriate algorithm is chosen, providing defaults for the relevant parameters. In general, model building at the function level makes many of the technical details of data mining transparent to the user. Models are built in the data mining server (DMS). After a model is built, it is persisted in the DMS and can be accessed by its user-specified unique name. The typical steps for model building are as follows:

1. Create input data (by associating a mining data object with existing data, for example, a table or file).
2. Create a function settings object.
3. Create a logical data specification and associate it with the function settings.

4. Create a data usage specification and associate it with the function settings.
5. Create algorithm settings (optional).
6. Invoke the build method.

Model testing gives an estimate of model accuracy. You can test classification models, as produced by the Naive Bayes algorithm. After a model is built, model testing computes the accuracy of a model's predictions when the model is applied to a new data set. The test results are stored in a mining test result object. A classification test result includes a confusion matrix that allows a data miner to understand the type and degree of classification errors made by the model. The test operation accepts the name of a previously-built model and data for testing the model. The test data must conform to the logical data specification used for building the model.

Online Recommendation

Applying a data mining model to data results in scores or predictions with an associated probability. You can score classification models, as produced by the Naive Bayes algorithm. The data to be scored must have attributes compatible with the training data, that is, it must have a superset of attributes with the same names and respective data types or a suitable mapping. The result of the apply operation is placed in the schema specified by the user. The user specifies the result content. For example, a user may want the customer identifier attribute, along with the score and probability, to be output in a table for each record in the provided mining data.

One useful quantity that is computed during the scoring process is the lift for a binary classification model, as produced by the Naive Bayes algorithm where the target attribute takes on exactly two values). Given a designated positive and negative value, test cases are sorted according to how confidently they are predicted to be positive instances (most confidently positive come first; most confidently negative come last). Based on that ordering, they are partitioned into quantiles. Then, the following statistics are calculated:

Target density of a quantile is the number of actually positive instances in that quantile divided by the total number of instances in the quantile.

Cumulative target density is the target density computed over the first n quantiles.

Quantile lift is the ratio of target density for the quantile to the target density over all the test data.

Cumulative percentage of records for a given quantile is the percentage of all test cases represented by the first n quantiles, starting at the most-confidently-positive end, up to and including the given quantile.

Cumulative number of targets for a given quantile is the number of actually positive instances in the first n quantiles (defined as above).

Cumulative number of nontargets is the number of actually negative instances in the first n quantiles (defined as above).

Cumulative lift for a given quantile is the ratio of the cumulative target density to the target density over all the test data.

Step 1108 of process 1100 involves generating online recommendations in response to actions of an online user. Step 1108 includes a plurality of steps, which may vary considerably depending upon the application. An example of the online recommendation process is shown as steps of step 1108 in FIG. 11. The process of step 1108 begins with step 1108-1, in which web customer enters implicit or explicit data that can be used for recommendation. In step 1108-2, the data are sent from the web application and received at the recommendation engine via the API. In step 1108-3, the data is stored for making predictions about this or future customers. In step 1108-4, the web application asks the recommendation engine, using the API, for one or more predictions and/or recommendations. For example, a prediction/recommendation may be obtained on what a web customer will prefer and how much he or she will prefer it. A prediction/recommendation can be a product, content, site structure, etc. In step 1108-5, the recommendation engine processes the API request for prediction/recommendation by calling the appropriate models and scoring the data using those models. In step 1108-6, the recommendation engine generates prediction/recommendation based on the scored data. In step 1108-7, the recommendation engine returns the prediction/recommendation to the web application. In step 1108-8, the web application dynamically generates the html code using the prediction/recommendation and sends it back to the web client.

The web application asking for a recommendation can be implemented with a variety of technologies, for example: JAVA SERVER PAGES® (JSP), SERVLETS®, and COLD-FUSION®. JSP® and SERVLETS® require a web server that can handle SERVLETS® and JSP®. COLDFUSION® applications run on the COLDFUSION WEB APPLICATION SERVER®.

Figure 13:
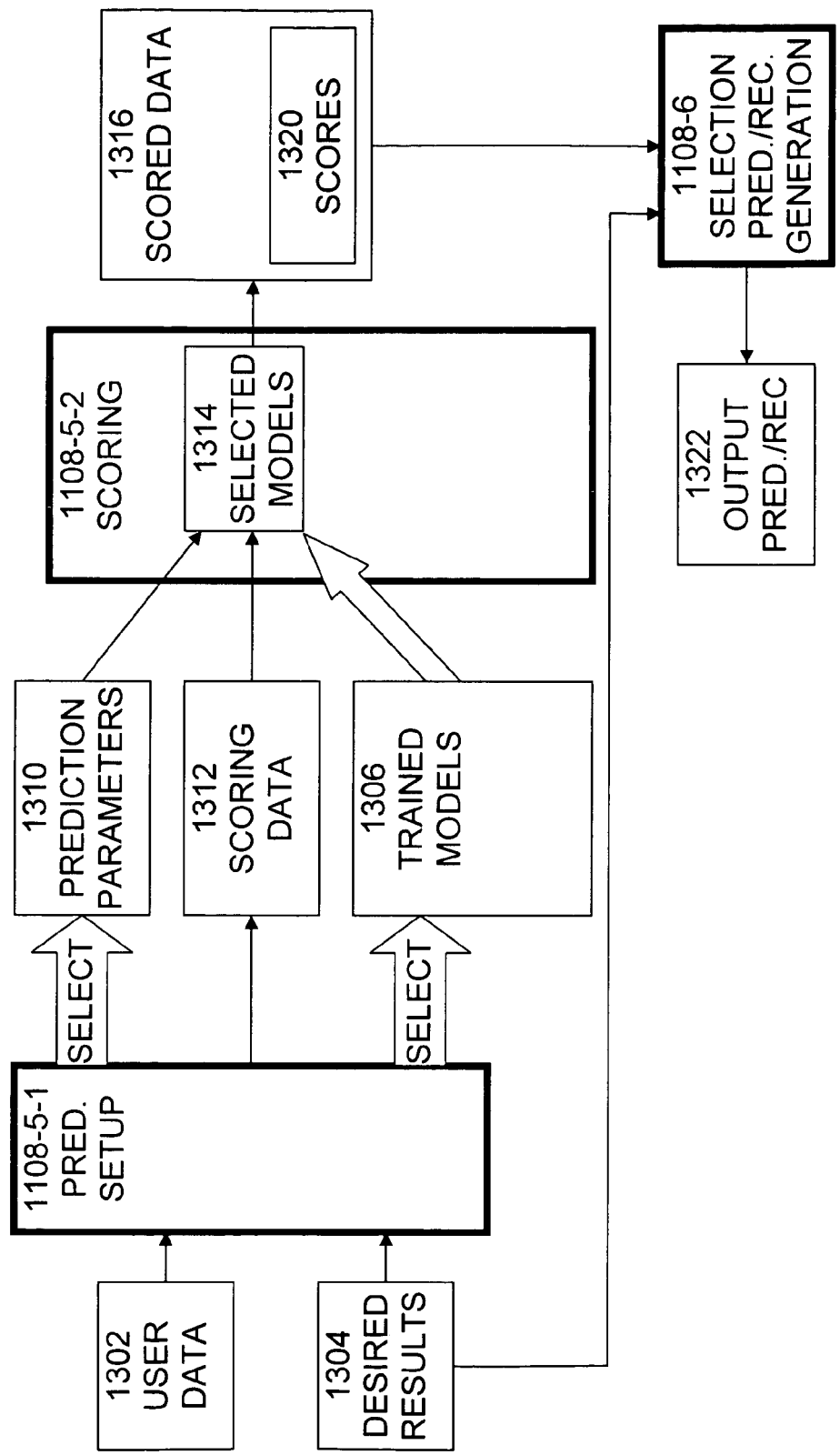
FIG. 13 is a data flow diagram of a model scoring step and a prediction/recommendation generation step shown in FIG. 11.
Figure 14:
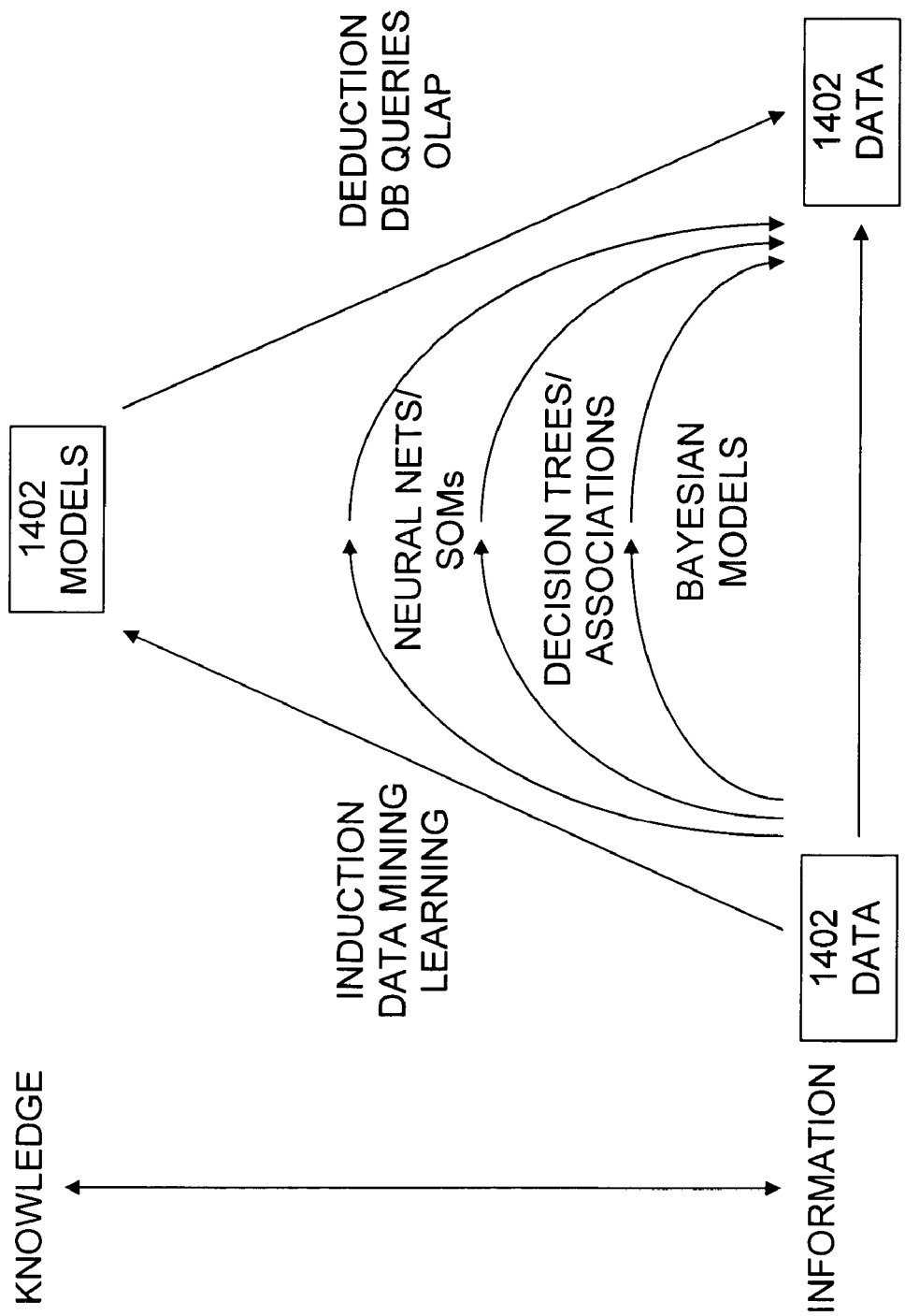
FIG. 14 is an illustration of the relationship among data, deductive and inductive models.

A data flow diagram of steps 1108-5 and 1108-6 of step 1108 of process 1100 is shown in FIG. 13. User data 1302 and desired results data 1304 are input to prediction setup step 1108-5-1. User data 1302 may include data relating to types predications/recommendations desired by the user, data relating to constraints on the generated predication/recommendation desired by the user, or relating to specific actions the user is currently taking while browsing a Website. Desired results data 1304 includes definitions of the types of predictions and recommendations and constraints on the predictions and recommendations desired by the operator of the enterprise Web mining system. For example, user data 1302 may include information relating to items the user is purchasing and desired results data 1304 may indicate that the desired result is a recommendation for another product to be suggested to the user for purchase.

Prediction setup step 1108-5-1 uses the input user data 1302 and desired results data 1304 to select trained models 1306, which include rules 1308, to select and generate prediction parameters 1310, and to generate scoring data 1312. Trained models 1306 were generated by model generation step 1106 of process 1100. Each model was output from model generation step 1230, shown in FIG. 12, and encoded in the appropriate format and deployed for use in making predictions or recommendations in step 1106-4 of process 1100. Prediction setup step 1108-5-1 selects of deployed models 1314 for use in scoring step 1108-5-2 based on the user data 1302 and on the desired results data 1304. Prediction parameters 1310 are parameters that are input to the scoring process 1108-5 to control the scoring of the deployed models against scoring data 1312 and are input to the selection and prediction/recommendation process 1108-6 to control the selection of the scored rules and the generation of predictions and recommendations. Prediction setup step 1108-5-1 selects and generate predication parameters 1310 for use in scoring step 1108-5-2 based on the user data 1302 and on the desired results data 1304. Predication setup step 1108-5-1 generates scoring data 1312 based on the input user data 1302 and the desired results data 1304.

The selected deployed models 1314, prediction parameters 1310, and scoring data 1312 are input to scoring step 1108-5-2. In scoring step 1108-5-2, scoring data 1312 is processed according to selected deployed models 1314, as controlled by prediction parameters 1310, to generate one or more scores for each row of data in the scoring data 1312 dataset. The scores for each row of scoring data how closely the row of scoring data matches some feature of the model, how much confidence may be placed in the match, how likely the output prediction/recommendation from the rule is likely to be true, and other statistical indicators. The scored data 1316 is output from scoring step 1108-5-2, along with the corresponding scores 1320 and other information for each scored row of data.

The scored data 1316 is input to selection and prediction/recommendation generation step, which evaluates the scores 1320 associated with the rows of data and selects at least a portion of the those rows of data. The selected rows of data are those having scores meeting the selection criteria. The selection criteria may be defined by desired results data 1304 and/or by predefined or default criteria included in selection/generation step 1108-6. In addition, the selection criteria may include a limit on the number of predictions/recommendations that are to be selected, or may indicate that the predictions/recommendations are to be sorted based on their associated scores. The selected rows of data are output as predictions/recommendations 1322 from step 1108-6 for transmission in step 1108-7 of process 1100.

Computational Model

The present invention uses a comprehensive computational model that incorporates supervised and unsupervised data mining functionality and algorithms to support the most general concept of enterprise web mining and a methodological and technical framework that identifies the main components in the data extraction, model building and model deployment process. The overall system model includes a plurality of individual models that are built using one or more modeling algorithms.

The types of models generated and used by the present invention may be categorized into several general classes. Among these classes are inductive models, supervised learning models, models using association and temporal pattern analysis, and models using clustering analysis.

Inductive models provide true generalization and high level descriptions that capture relationships, correlations, and trends in data. The relationship among data, deductive and inductive models is shown in FIG. 13. Inductive models do not assume any preconceived hypothesis and operate exclusively on data. They are the most powerful technology to predict and make on-line recommendations.

Supervised learning modeling is based on the traditional supervised learning approach as applied to customer account-based data. There is a well-defined target field that the model uses as a dependent variable. This type of model is very useful for general classification using models built on existing corporate or web session records. Once trained these models provide profiling and segmentation of existing records or prediction (scoring/recommendation) of new ones.

The supervised learning algorithms used by the present invention include decision trees of the classification and regression tree (CART) type and Naïve Bayes. CART is a very powerful non-parametric classification and regression method that produces accurate and easily interpretable models. It is a good representative of the wide class of decision-tree rule-based methods. A nice feature of decision-trees is the fact that the model is transparent, and can be represented as a set of rules in plain English, PL/SQL, Java or store procedures. This makes them ideal models for enterprise-wide business applications, query based analytical tools and e-commerce in general.

Typically, supervised learning models are constructed off-line and then the created models are used for batch scoring or on-line predictions. Under this paradigm the system supports three different activities. First, a model may be built using default parameters or using modified parameters to improve the model. This is done using CART or Naive Bayes. Second, a table of new records may be scored, using the traditional data mining scoring technique. Third, the model may be deployed. This is done by exporting an independent stand-alone Java version of the model and integrating it into the web server so that it can be used on-line to score new records on the fly or modify the behavior of the web pages. In particular, the model may modify navigation paths, such as change links to maximize positive outcome for target field, or the model may modify content, such as show advertisements and recommendations to maximize positive outcome for the target field. In order to make this scheme easily accessible to the user, an appropriate user interface implementing the basic methodology is available.

A potential improvement over this supervised learning scheme is the introduction of on-line learning. In this case the model is built incrementally on top of a data stream. As the model building process is working all of the time, an updated model is always available to be used on-line. This also allows the model to adapt better to recent trends and changing conditions of the data stream. In this case the data stream can be the click stream produce the web server.

Naive Bayes is a fast algorithm that provides approximated models for general prediction or feature selection. It is termed "Naïve" due to the fact that it only considers the correlations between each input field and the target. The predictions are made based on the relative ratio of conditional probabilities for each of the target values.

Models built using association and temporal pattern analysis use the traditional association rules of market basket analysis applied to the web transaction-based tables. Such models find combination of items that appear frequently in transactions and describe them as rules of the form: if item A and item B then item C. Each rule is characterized by a support level (i.e. the number of records that obey the rule) and a confidence level (i.e. how many other rules share the precedent clause) parameters. Temporal pattern analysis takes into account not only the occurrence of particular combination of items but also their particular sequence in a time series. The exact format of the web transaction-based tables depends on the specific data mining tasks. For example mining association rules do not need temporal information, so time information can be filtered out. On the other hand, mining temporal patterns requires the ordering of transactions according to transaction times. The amount and large feature space of web data requires special data representations to take advantage of sparseness.

Clustering analysis is generally done in the context of class discovery, the finding of unknown groups or classes that define a taxonomy for the records at hand, or for data reduction by finding a small number of suitable representatives (centroids). In the present invention, clustering analysis algorithms include k-means and self-organizing maps (SOM) to provide the basic clustering. In addition to the algorithms, a method for cluster validation and interpretation (visualization) facilitates the use and evaluation of the results. The most important application to clustering is in the context of account-based tables, although transaction-based tables can also be clustered. Clustering can also be used to expose well-supported structure in the dataset and then to correlate this with a target class of interest. This amounts to a combined class discovery and interpretation methodology.

The personalization application uses particular examples of association rule and Bayesian algorithms in order to create models, which are used to generate personalized recommendations. The two algorithms are Predictive Association Rules
Transactional Naive Bayes Predictive Association Rules The most familiar use of association rules is what we know as "market basket analysis," i.e., rules about what goes with what in a shopping cart, such as "eighty percent of people who buy beer also buy potato chips." The association rules algorithm finds combinations of items that appear frequently in transactions and describes them as rules of the following "if-then" form: "If A, then B." where A is the antecedent and B is the consequent. (Note that the two sides of the proposition can be more than one item each; for example, "If A, B, and C, then D and E." For Predictive Association Rules, there is only one item in the consequent.)

It turns out that many such rules can be found—the challenge is to find those that are meaningful or interesting and that also lead to actionable business decisions. An example is "eighty percent of people who buy beer and pretzels also buy chocolate." This combination is not obvious, and it can lead to a change in display layout, e.g., moving the chocolate display closer to where beer is on sale.

On the other hand, a rule like "eighty percent of people who buy paint also buy paint brushes" is not very useful, given that it's obvious and doesn't lead you to change the arrangement of these items in your store—they're probably already displayed near each other. Similarly, "eighty percent of people who buy toothpaste and tissues also buy tomatoes" is not obvious, and is probably not useful as it may not lead to any actionable business decision.

To identify rules that are useful or interesting, three measures are introduced: support, confidence, and lift.

Support: First, determine which rules have strong support, i.e., rules that are based on many examples in the database. Support is the percentage of records that obey the rule, i.e., baskets that contain both A and B.

Confidence: Next, determine which rules have high confidence, i.e., instances that obey the rule (contain both A and B) as a percentage of all instances of A. For example, assume you have 10 instances of A, 8 of which also have B; the other 2 do not have B. Confidence is 8 out of 10, or 80 percent.

Lift: Lift compares the chances of having B, given A, to the chances of having B in any random basket. Of the three, lift is the most useful because it improves predictability.

Transactional Naive Bayes

Naive Bayes is a type of supervised-learning module that contains examples of the input-target mapping the model tries to learn. Such models make predictions about new data based on the examination of previous data. Different types of models have different internal approaches to learning from previous data. The Naive Bayes algorithm uses the mathematics of Bayes' Theorem to make its predictions.

Bayes' Theorem is about conditional probabilities. It states that the probability of a particular predicted event, given the evidence in this instance, is computed from three other numbers: the probability of that prediction in similar situations in general, ignoring the specific evidence (this is called the prior probability); times the probability of seeing the evidence we have here, given that the particular prediction is correct; divided by the sum, for each possible prediction (including the present one), of a similar product for that prediction (i.e., the probability of that prediction in general, times the probability of seeing the current evidence given that possible prediction).

A simplifying assumption (the "naive" part) is that the probability of the combined pieces of evidence, given this prediction, is simply the product of the probabilities of the individual pieces of evidence, given this prediction. The assumption is true when the pieces of evidence work independently of one another, without mutual interference. In other cases, the assumption merely approximates the true value. In practice, the approximation usually does not degrade the model's predictive accuracy much, and it makes the difference between a computationally feasible algorithm and an intractable one.

Compared to other supervised-learning modules, Naive Bayes has the advantages of simplicity and speed. It also lends itself to future extensions supporting incremental learning and distributed learning.

"Transactional Naive Bayes" refers to the way the input is formatted; the algorithm is the same. The table below shows an example of traditional data format, with columns for the items (customer, apples, oranges, pears, and bananas) and rows for the customers (Joe, Jim, Jeff), and zeroes or ones in each table cell, indicating whether, for example, Joe bought an apple (no), an orange (no), a pear (no), or a banana (yes):

|      | apples | oranges | pears | bananas |
|------|--------|---------|-------|---------|
| Joe  | 0      | 0       | 0     | 1       |
| Jim  | 1      | 0       | 0     | 1       |
| Jeff | 0      | 1       | 0     | 0       |

Traditional data layout often produces a sparse matrix because of all those zeroes; it takes up more space in the database, and therefore takes more time in calculations. Transaction-based format has basically two columns: customer and "hits." For Joe, the table cell contains "bananas":

| Joe  | bananas         |
|------|-----------------|
| Jim  | apples, bananas |
| Jeff | oranges         |

Transactional format looks like a "shopping basket" rather than a checklist and is better in cases where the customers buy only subsets of products. Transactional format has the advantage of being the way the data is stored in the database for this type of problem.

Data Mining Objects

Training Tables

A model is generated by training a selected modeling algorithm with training data. Once trained, the model may be used to make predictions and/or recommendations. It is useful to the understanding of training tables to define some terms. A "session" is a list of items and products that characterize a user's web session. A session contains the transaction items that were visited, clicked-on, typed or purchased by a registered or unregistered customer. It also includes the keywords used in search engines or web forms. A session generates a set of clickstream items as the customer navigates through the site and browses or buys products.

An "item" is a clickstream element in a web session. For example a particular web page, URL link, form, etc. The main types are:

Item:
Simple web element (URL, picture etc.)
Product
Keyword
Item-class (taxonomy)

An "attribute" is a column in an account table that represents information about a customer, such as age, income demographics etc.

A "product" is an item of interest that is typically being offered and for which recommendations will be relevant. Products are both session items and account-based.

A "customer" is a visitor to the web site or an existing customer that has registered and for which there is already an account. Customers that have been registered or for which information is already captured in a corporate database become 'accounts' and have account-ids and account table entries associated with them. Customers that navigate the web site but are not identified by registration or other means produce sessions entries but not account entries.

Figure 15:
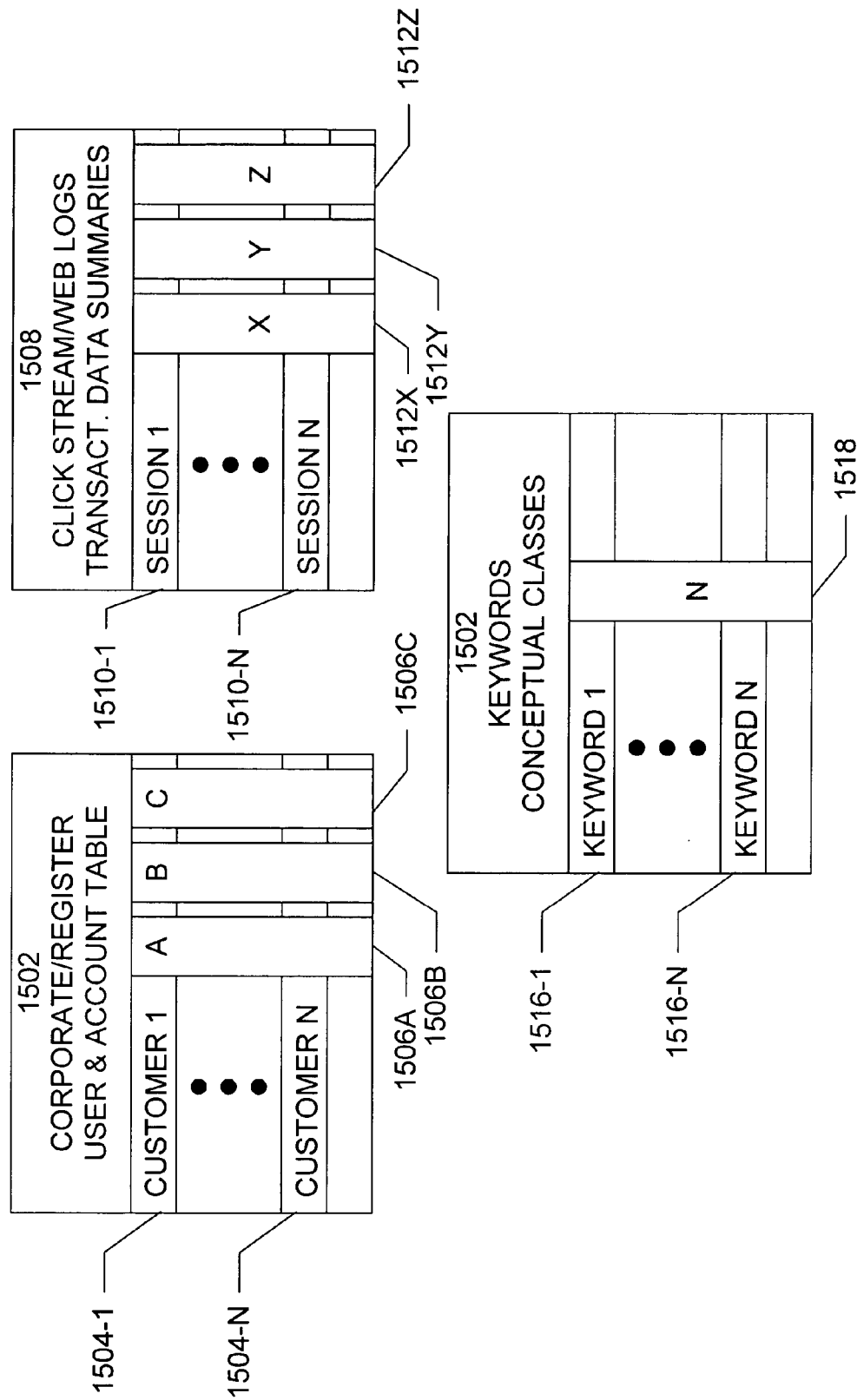
FIG. 15 is an exemplary format of training tables used in the present invention.

Generally, the training data can be consolidated in three types of tables shown in FIG. 15. The first type of table is a traditional corporate mining table 1502 in which, for example, each row corresponds to a customer and each column is an attribute such as age, account type, payment status etc. For example, in table 1502, row 1504-1 corresponds to customer 1, row 1504-N corresponds to customer N, column 1506A corresponds to attribute A, column 1506B corresponds to attribute B, and column 1506C corresponds to attribute C. Examples of account attributes include:

Account-id (unique identifier of customer account)
Customer Name
Customer location
IP (Internet address of customer)
e-mail (e-mail address of customer)
Age (age of customer)
<attribute x> demographics or other account information
<attribute y> demographics or other account information
Account starting date (date the account was created)
Account termination date (date the account was terminated)
Account type (type of customer e.g. individual, company etc.)
Product-list (list of products that the customer has purchased in the past)

The second type of table, such as table 1508, represents entries generated by web sessions, preferably at the fine grain level, which includes flags to indicate if particular web pages were visited, etc. Thus, in table 1508, row 1510-1 corresponds to session 1 and row 1510-N corresponds to session N. Each session is typically associated with a particular user or customer who initiated and/or participated in the session. Likewise, column 1512x corresponds to web page X, column 1512Y corresponds to web page Y, and column 1512Z corresponds to web page Z. There are two sub-types of tables that include data about web sessions. The first is a session mining table, which stores detailed information about a particular session. Examples of data in a session mining table include:

Session (unique identifier if web session).
Account (if available account associated with existing customer).
Items-list (list of items, keywords or products visited, clicked-on or purchased in session).
Item-classes (Taxonomies associated with item and keyword lists).

The second subtype is a session summary mining table, which stores data summarizing a plurality of web sessions. Examples of data in a session summary mining table include:

Account (unique identifier of customer account).
Items-list (list summarizing items from all customer's sessions).
Item-classes (list summarizing taxonomies for all customer's sessions).
List of sessions (list of sessions associated with this account).

The third type of table, such as table 1514, is a conceptual table in which semantic classes mimic the session information of the table 1508, but at a higher level. For example, table 1514 contains keywords that represent membership in general classes, such as 'toys=TRUE', to represent the fact that in one session several hyperlinks leading to toy products were clicked or that the word 'toy' was used in the web server's search engine. Thus, in table 1514, row 1516-1 corresponds to keyword 1, row 1516-N corresponds to keyword M, and column 1518 corresponds to.

Figure 16:
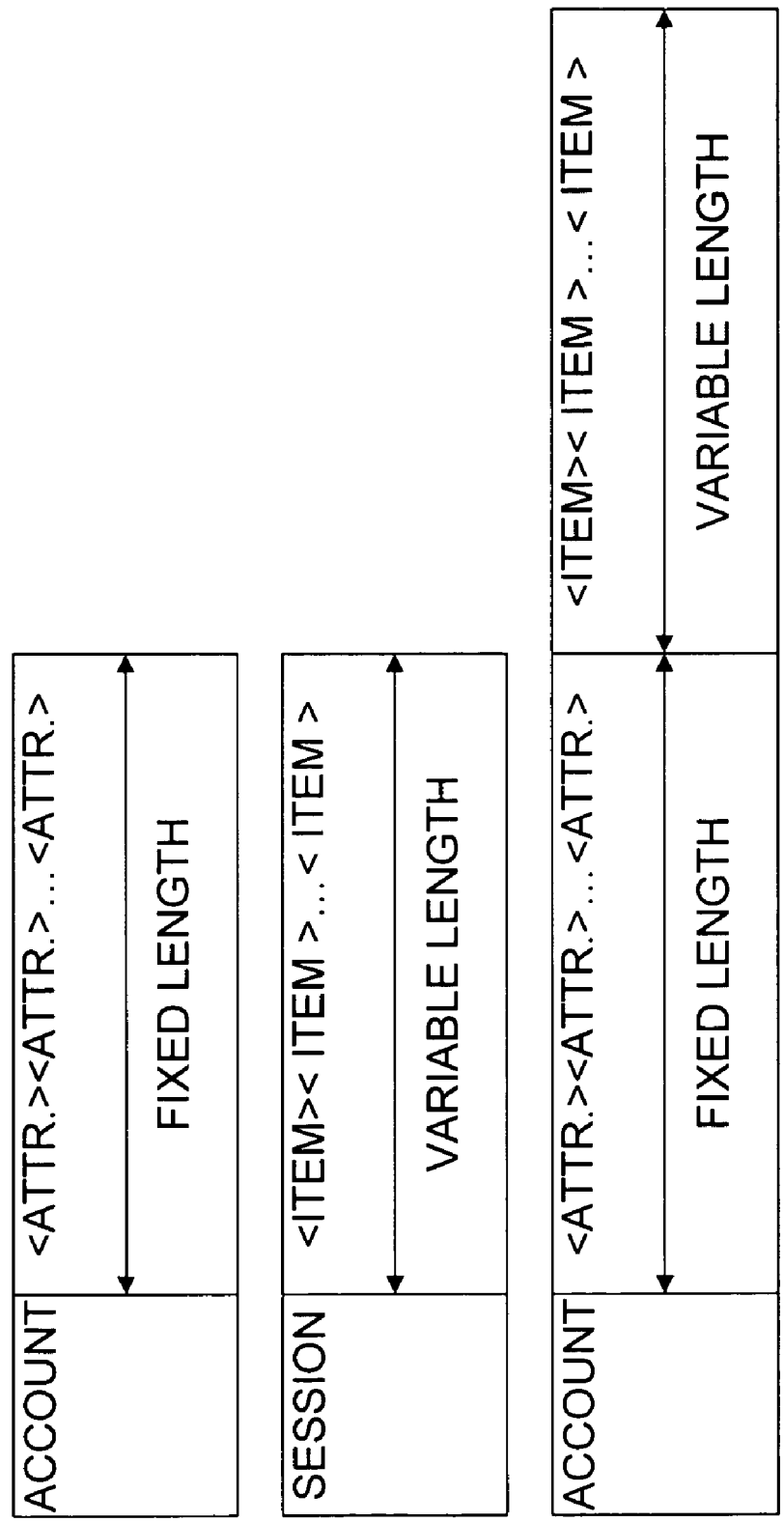
FIG. 16 is an exemplary format of entries in the training tables shown in FIG. 15.

FIG. 16 is an exemplary format of entries in the training tables shown in FIG. 15.

Figure 17:
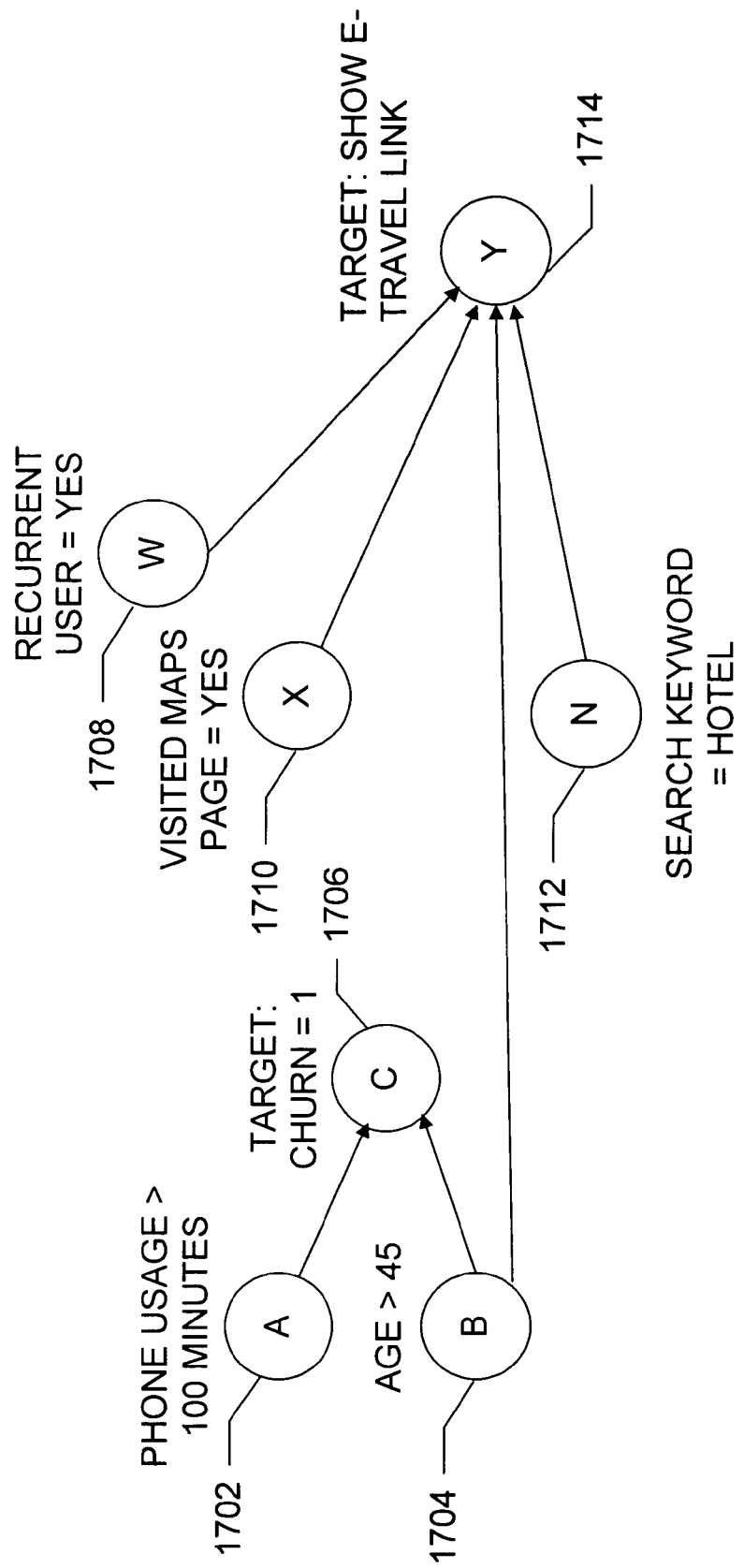
FIG. 17 illustrates an example of an inductive model generated using a naïve Bayes algorithm and/or decision trees.

The tables shown in FIG. 15 consolidate the information that is fed into the model building process. The system then operates on the different types of data across the enterprise as soon as an appropriate mapping is built for the data. An example of an inductive model that uses Bayes algorithm and/or decision trees is shown in FIG. 17. User and account data from table 1502 of FIG. 15, such as phone usage data 1702 and user age data 1704, is used to generate an output from the model, which is a target for churn 1706. Likewise, user and account data from table 1502 of FIG. 15, such as user age data 1704, session data from table 1508, such as whether the user is a recurrent user 1708 and whether the user visited a map page 1710, and keyword data from table 1514 of FIG. 15, such as searching on the keyword "hotel" 1712, is used to generated an output from the model, which is a target action—showing an e-travel link 1714.

Figure 18:
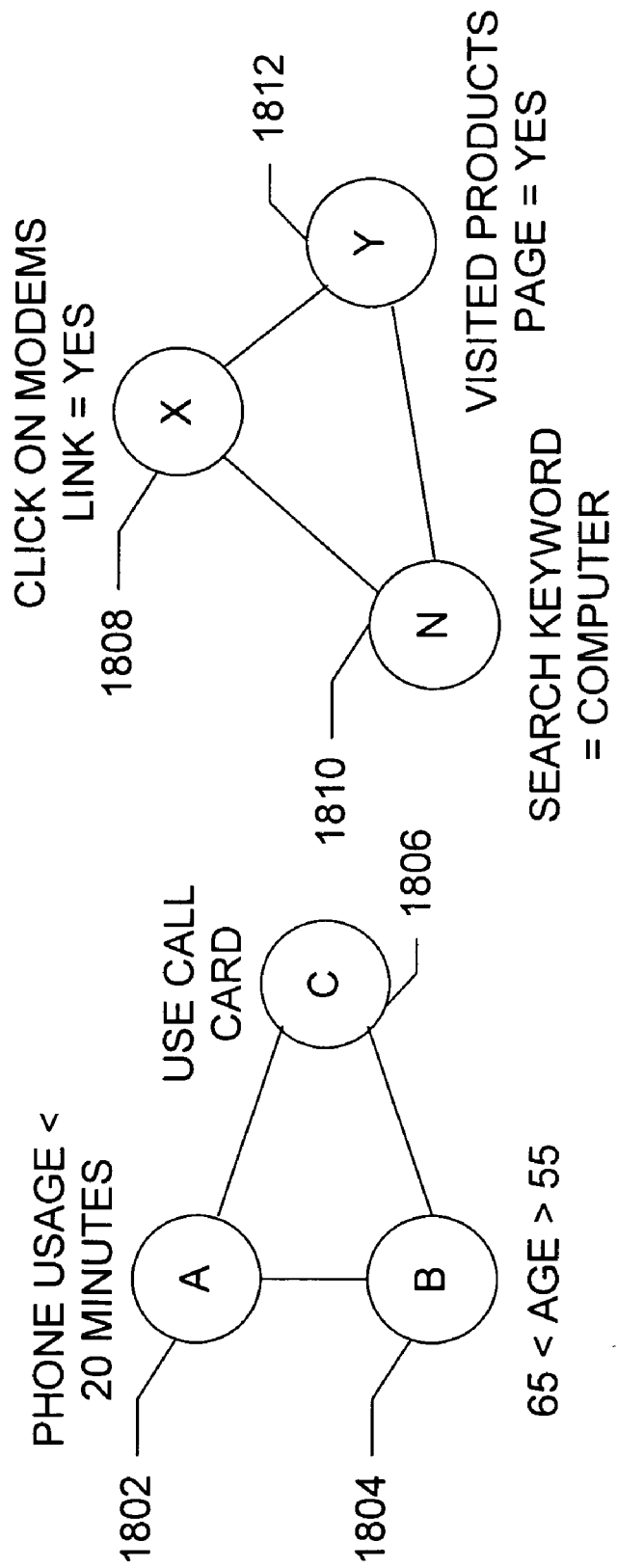
FIG. 18 illustrates an example of inductive models generated using clustering and association algorithms.

An example of an inductive model that uses clustering and associations is shown in FIG. 18. As an example of clustering, user and account data from table 1502 of FIG. 15, such as phone usage data 1802, user age data 1804, and calling card usage data 1806 is analyzed to located clusters of data that may be modeled. As an example of association, session data from table 1508 of FIG. 15, such as whether the user clicked on the modems link 1808 and whether the user visited the products page, and keyword data from table 1514 of FIG. 15, such as searching on the keyword "computer" 1812, is analyzed to determine associations among data that may be modeled.

Physical Data Specification

A physical data specification object specifies the characteristics of the physical data to be used for mining, for example, whether the data is in transactional format and the roles the various data columns play. The data referenced by a physical data specification object can be used in several ways: model building, scoring, lift computation, statistical analysis, etc. The data mining physical data is preferably in one of two formats:
Transactional
Nontransactional These formats describe how to interpret each case as stored in a given database table.

Transactional Data Format: In the transactional data format, each case is stored as multiple records in a table with schema roles sequenceID, attribute_name, and value. sequenceID is an integer that associates multiple records in a transactional table. attribute_name is a string containing the name of the attribute. value is an integer representing the value of the attribute. The data mining system supports discretization (binning) of data to facilitate model building. The data mining system discretization utilities can be used to bin the data as required by the data mining algorithms.

Nontransactional Data Format: In the nontransactional format, each case is stored as one record (row) in a table. Nontransactional data is not required to provide a key column to uniquely identify each record. However, a key is recommended to associate cases with resulting scores for supervised learning. The data mining operations (build, apply, test, and compute lift) require that nontransactional data be discretized (binned). The data mining system discretization utilities can be used to bin the data. For more information, see "Discretization" later in this chapter. The data mining algorithms automatically convert all nontransactional data to transactional data prior to model building.

Mining Model

A mining model object is the result of building a model based on a mining settings specification. The representation of the model depends on the algorithm specified by the user or selected by the underlying DMS. The model can be used for direct inspection, for example, to examine the rules produced from association rules, or to score data from a classification model. The data mining system supports the persistence of mining models as independent named entities in the DMS. A mining model contains a copy of the MFS used to build it.

Mining Results

A mining result object contains the end products of one of the following mining operations: apply, test, or compute lift. The data mining system supports the persistence of mining results as independent, named entities in the DMS. A mining results object contains the operation start time and end time, the name of the model used, input data location, and output data location (if any) for the data mining operation. An apply result names the destination table (schema and table space) for the result. The source table is the table that is input to the apply function for scoring. A classification test result is a table that contains the accuracy and references the confusion matrix. Lift computation results consist of the lift results calculated on a per quantile basis.

User and Application View

An effective enterprise data mining system has to provide dynamical on-line predictions and recommendations. Those can be offered in a more or less general way by classifying different web page elements as 'inputs' or 'targets.' Inputs represent most of the common elements such as specific clicks, links, search windows etc. that are used as potential inputs to the inductive models. These elements may need considerable pre-processing before they become actual model inputs but they are the basic input to the process. Targets are those elements that we want to model, predict or recommend based on previous behavior captured by the models. A product exposing this dichotomy is already useful but to maximize the benefit to the non-technical user an additional conceptual layer of more specific problem- or application-oriented definition is needed. This layer corresponds to the customer life cycle CRM orientation described in the requirement list. From this perspective a number of application-oriented methodologies and user interfaces can be built around traditional CRM business and marketing concepts.

Cross-Selling

Cross-selling is the perhaps the most direct use of ad and product recommendation for existing customers. Technically this translates into at least three cases:

Remind customer of a product he usually buys when purchasing a basket like the current one.

Suggest products based on the purchases of a customer with similar purchasing patterns to the customer current basket.

Suggest a product based not only on similar purchasing patterns but also based on similar demographics and browsing patterns The last two cases allow for the suggestion of novelty items (items never bought by the customer). The first two cases only make use of the data in the transaction table. The last case uses data from all three tables.

Product recommendation can be obtained through a number of methods:

Explicit decision tree or association rules

K-nearest neighbors: query or similarity search of customers with similar buying patterns.

Decision trees and association rules return recommendations based on abstractions (models) of shopping cart history or corporate records that are built in advance. K-nearest neighbors score the current shopping cart against the table of aggregate transactions for each customer. Confidence measure for each possible recommended product can be constructed for all three methods. These confidence measures should be complemented with weights derived from business rules. For example, although product A is a product more likely to be bought than B, the profit from product B is higher, making it a more desirable product to be sold from the merchant's point of view. The key measure is the expected profit from a recommendation: (probability (confidence) of a recommendation being bought)×profit. Here is a clear example of why an application-oriented layer is necessary. In the third case above where all the different tables are used, a two-stage process is probably desirable. First the customer profile is recovered by assigning him to a demographic and a browsing behavior cluster. Then the recommendation is computed taking in account only the transactions generated from customers belonging to the same profile. The rational here is that we should look for similar basket among people with similar demographics, for example.

Up-Selling

Up-selling is quite similar to the cross-selling approach but one deals mainly with new customer with no previous registered history.

Segmentation

Segmentation can be done using the profiling clusters or the un-clustered customer data. The first is quick and allows many different studies to be quickly performed. The un-clustered customer data case is slower but probably more precise. In the case of segmentation a measurement has to be selected. For example: purchases in dollar can be used to segment customers (or clusters) into bad, average, good customers.

Customer Retention/Churn

In order to determine customer retention or churn, the system keeps track of changes of an appropriate metric, e.g., purchases in dollar, number of visits, against the moving average of the measure in the customer's history. If the measure is falling then the customer is probably 'churning.' If the measure is increasing it might signal a change in demographics. A thank you offer that can capture more data on the customer can be used to retain/reward good customers and obtain new data to re-assign the customer to a new segment.

Profitability

Profitability requires segmentation and keeping track of changes of a metric (e.g., purchases in dollar, number of visits) against the average of the measure in the customer's segment. If the customer is below a defined threshold (e.g. the average) then the system tries to sell more.

Off-line Web Market Basket Analysis

Off-line web market basket analysis is the extension of traditional market basket analysis to a web site viewed as a 'virtual supermarket.' The system finds common trends and correlation in web click stream, builds models and produce batch reports. This simple capability is not yet included in many of the existing click stream analysis products.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method of enterprise web mining comprising the steps of:
    collecting data from a plurality of data sources, including proprietary corporate data comprising at least one of proprietary account or user-based data, external data comprising data acquired from sources external to the system, Web data comprising at least one of Web traffic data, web server application program interface data or Web server log data, and Web transaction data comprising data relating to transactions completed over the Web;
    selecting data that is relevant to a desired output from among the collected data by mapping between general attributes and particular features, the selected data having reduced dimensionality relative to the collected data;
    pre-processing the selected data by performing at least one of:
    removing redundant or irrelevant information from Web server log data,
    analyzing a whole Website from the Web server log data,
    converting to filenames from the Web server log data to page titles, and
    converting IP addresses from the Web traffic data to domain names;
    building a plurality of database tables from the pre-processed selected data, wherein the acquired data comprises a plurality of different types of data;
    integrating the collected data by forming an integrated database comprising collected data in a coherent format using generated taxonomies to group attributes of the data and using generated profiles of the data;
    generating a plurality of data mining models using the collected data; and
    generating a prediction or recommendation using at least one of the plurality of generated data mining models, in response to a received request for a recommendation or prediction.

2. The method of claim 1, wherein the model generating step comprises the steps of:
    selecting an algorithm to be used to generate a model;
    generating at least one model using the selected algorithm and data included in the integrated database; and
    deploying the at least one model.

3. The method of claim 2, wherein the step of deploying the at least one model comprises the step of:
    generating program code implementing the model.

4. The method of claim 3, wherein the step of generating an online prediction or recommendation comprises the steps of:
    receiving a request for a prediction or recommendation;
    scoring a model using data included in the integrated database;
    generating a predication or recommendation based on the generated score; and
    transmitting the predication or recommendation.

5. The method of claim 4, wherein the step of pre-processing the selected data further comprises the step of:
    collecting pre-defined items of data passed by a web server.

6. A computer program product for performing an enterprise web mining process in an electronic data processing system, comprising:
    a computer readable storage medium;
    computer program instructions, recorded on the computer readable storage medium, executable by a processor, for performing the steps of:
    collecting data from a plurality of data sources, including proprietary corporate data comprising at least one of proprietary account or user-based data, external data comprising data acquired from sources external to the system, Web data comprising at least one of Web traffic data, web server application program interface data or Web server log data, and Web transaction data comprising data relating to transactions completed over the Web;
    selecting data that is relevant to a desired output from among the collected data by mapping between general attributes and particular features, the selected data having reduced dimensionality relative to the collected data;

pre-processing the selected data by performing at least one of:

removing redundant or irrelevant information from Web server log data, analyzing a whole Website from the Web server log data, converting to filenames from the Web server log data to page titles, and converting IP addresses from the Web traffic data to domain names;

building a plurality of database tables from the pre-processed selected data, wherein the acquired data comprises a plurality of different types of data;

integrating the collected data by forming an integrated database comprising collected data in a coherent format using generated taxonomies to group attributes of the data and using generated profiles of the data;

generating a plurality of data mining models using the collected data; and generating a prediction or recommendation using at least one of the plurality of generated data mining models, in response to a received request for a recommendation or prediction.

7. The computer program product of claim 6, wherein the model generating step comprises the steps of:

selecting an algorithm to be used to generate a model;

generating at least one model using the selected algorithm and data included in the integrated database; and deploying the at least one model.

8. The computer program product of claim 7, wherein the step of deploying the at least one model comprises the step of:

generating program code implementing the model.

9. The computer program product of claim 8, wherein the step of generating an online prediction or recommendation comprises the steps of:

receiving a request for a prediction or recommendation;

scoring a model using data included in the integrated database;

generating a predication or recommendation based on the generated score; and transmitting the predication or recommendation.

10. The computer program product of claim 9, wherein the step of pre-processing the selected data further comprises the step of:

collecting pre-defined items of data passed by a web server.

11. A system for performing an enterprise web mining process, comprising:

a processor operable to execute computer program instructions; and a memory operable to store computer program instructions executable by the processor, for performing the steps of:

collecting data from a plurality of data sources, including proprietary corporate data comprising at least one of proprietary account or user-based data, external data comprising data acquired from sources external to the system, Web data comprising at least one of Web traffic data, web server application program interface data or Web server log data, and Web transaction data comprising data relating to transactions completed over the Web;

selecting data that is relevant to a desired output from among the collected data by mapping between general attributes and particular features, the selected data having reduced dimensionality relative to the collected data;

pre-processing the selected data by performing at least one of:

removing redundant or irrelevant information from Web server log data, analyzing a whole Website from the Web server log data, converting to filenames from the Web server log data to page titles, and converting IP addresses from the Web traffic data to domain names;

building a plurality of database tables from the pre-processed selected data, wherein the acquired data comprises a plurality of different types of data;

integrating the collected data by forming an integrated database comprising collected data in a coherent format using generated taxonomies to group attributes of the data and using generated profiles of the data;

generating a plurality of data mining models using the collected data; and generating a prediction or recommendation using at least one of the plurality of generated data mining models, in response to a received request for a recommendation or prediction.

12. The system of claim 11, wherein the model generating step comprises the steps of:

selecting an algorithm to be used to generate a model;

generating at least one model using the selected algorithm and data included in the integrated database; and deploying the at least one model.

13. The system of claim 12, wherein the step of deploying the at least one model comprises the step of:

generating program code implementing the model.

14. The system of claim 13, wherein the step of generating an online prediction or recommendation comprises the steps of:

receiving a request for a prediction or recommendation;

scoring a model using data included in the integrated database;

generating a predication or recommendation based on the generated score; and transmitting the predication or recommendation.

15. The system of claim 14, wherein the step of pre-processing the selected data further comprises the step of:

collecting pre-defined items of data passed by a web server.

16. An enterprise web mining system comprising:

a database system coupled to a plurality of data sources, the database system operable to store data collected from the data sources, the data sources including proprietary corporate data comprising at least one of proprietary account or user-based data, external data comprising data acquired from sources external to the system, Web data comprising at least one of Web traffic data, web server application program interface data and Web server log data, and Web transaction data comprising data relating to transactions completed over the Web, the database further operable to select data that is relevant to a desired output from among the collected data by mapping between general attributes and particular features, the selected data having reduced dimensionality relative to the collected data, the database further operable to pre-process the selected data by performing at least one of removing redundant or irrelevant information from Web server log data, analyzing a whole Website from the Web server log data, converting to filenames from the Web server log data to page titles, and converting IP addresses from the Web traffic data to domain names, the database further operable to build a plurality of database tables from the pre-processed selected data, wherein the acquired data comprises a plurality of different types of data, and the database further operable to integrate the collected data by forming an integrated database comprising collected data in a coherent format using generated taxonomies to group attributes of the data and using generated profiles of the data;

a data mining engine coupled to the database, the data mining engine operable to generate a plurality of data mining models using the integrated database;

a server coupled to a network, the server operable to receive a request for a prediction or recommendation over the network, generate a prediction or recommendation using at least one of the data mining models, and transmit the generated prediction or recommendation.

17. The system of claim 16, wherein the data mining engine is further operable to:

select an algorithm to be used to generate a model;

generate at least one model using the selected algorithm and data included in the integrated database; and deploy the at least one model.

18. The system of claim 17, wherein the deployed model comprises program code implementing the model.

19. The system of claim 18, wherein the server is operable to generate a prediction or recommendation by scoring a model using data included in the integrated database and generating a predication or recommendation based on the generated score.

20. The system of claim 19, further comprising a data pre-processing engine pre-processing the selected data.

21. The system of claim 20, wherein the database comprises:

a plurality of database tables built from the pre-processed selected data.

22. The system of claim 21, wherein the plurality of database tables forms an integrated database comprising collected data in a coherent format.

23. The system of claim 22, wherein the data mining engine is further operable to:

select an algorithm to be used to generate a model;

generate at least one model using the selected algorithm and data included in the integrated database; and deploy the at least one model.

24. The system of claim 23, wherein the deployed model comprises program code implementing the model.

25. The system of claim 24, wherein the server is operable to generate a prediction or recommendation by scoring a model using data included in the integrated database and generating a predication or recommendation based on the generated score.

26. The method of claim 25, wherein the data pre-processing engine pre-processes the selected data by collecting pre-defined items of data passed by a web server.

* * * * *